(12) United States Patent  
Earl et al.

(10) Patent No.: US 7,255,305 B2
(45) Date of Patent: Aug. 14, 2007

(54) FLYING DEVICE UTILIZING NATURAL PRINCIPLES

(76) Inventors: Milan Dennis Earl, 607 Beacon St., Moorestown, NJ (US) 08057; Rebecca A. Earl, 607 Beacon St., Moorestown, NJ (US) 08057

( * ) Notice: Subject to any disclaimer, the term of this patent is extended or adjusted under 35 U.S.C. 154(b) by 211 days.

(21) Appl. No.: 10/979,046

(22) Filed: Nov. 2, 2004

(65) Prior Publication Data

US 2006/0102782 A1    May 18, 2006

(51) Int. Cl.
*B64C 33/00*      (2006.01)
(52) U.S. Cl. .......................... 244/11; 244/22; 244/72; 244/28
(58) Field of Classification Search ................ 244/11, 244/22, 72, 28; 446/35; 416/66, 81
See application file for complete search history.

(56) References Cited

U.S. PATENT DOCUMENTS

| | | | |
|---|---|---|---|
| 781,104 A | | 1/1905 | Slinn |
| 1,076,644 A | * | 10/1913 | quiox .......................... 244/233 |
| 1,287,779 A | * | 12/1918 | Springer ..................... 446/44 |
| 1,338,025 A | | 4/1920 | Lind |
| 1,412,346 A | | 4/1922 | Goldschmidt |
| 1,758,178 A | * | 5/1930 | Slinn ........................... 446/35 |
| 1,783,029 A | * | 11/1930 | White .......................... 244/72 |
| 1,936,072 A | * | 11/1933 | Roderick .................... 185/37 |
| 2,321,977 A | * | 6/1943 | Boatright ..................... 446/35 |
| 2,783,955 A | * | 3/1957 | Fitz Patrick ................. 244/22 |
| 3,626,555 A | * | 12/1971 | Albertini et al. ............. 446/35 |
| 3,728,814 A | * | 4/1973 | Ruston ......................... 446/35 |
| 4,155,195 A | * | 5/1979 | Leigh-Hunt .................. 446/35 |
| 4,195,438 A | | 4/1980 | Dale et al. |
| D257,731 S | * | 12/1980 | Zack et al. ................ D21/449 |
| 4,417,707 A | | 11/1983 | Leong |

(Continued)

FOREIGN PATENT DOCUMENTS

BG           95179          9/1992

OTHER PUBLICATIONS

J. D. DeLaurier "An Aerodynamic Model For Flapping Wing Flight" Magazine Article—Aeronautical Journal Apr. 1993 pp. 125-130.

(Continued)

*Primary Examiner*—Robert P. Swiatek
*Assistant Examiner*—Stephen A Holzen

(57) ABSTRACT

An efficient flying device having flapping wings, an ornithopter, which uses many of the principles seen in bird flight, is presented herein. The wings are highly flexible, translationally stable and oscillate as a natural pendulum. Described as a springboard, the wings have a singular natural frequency, and a pumping means drives the wings at that frequency. Feedback means are described by which to accomplish this, whereby deflection of the wing affects an escapement mechanism which controls the timing and direction of the pumping means. Wing design is described whereby camber, flexure, torsion and directionality of wing components affect efficient propulsion, lift and differential reactivity with air during downstrokes and upstrokes. A crook element in the wing spar at a location proximal to the body of the device redirects vertical oscillation to horizontal. Other features are addressed, such as rearward vortex production and reaction, a double aerofoil wing construction, lateral and vertical wing curvature, rearward wing and featherlike element flexure to produce thrust, and connection of separate elastic elements to reduce power requirements.

10 Claims, 18 Drawing Sheets

U.S. PATENT DOCUMENTS

| | | | | |
|---|---|---|---|---|
| 4,749,149 | A | * | 6/1988 | Gruich .................. 244/22 |
| 5,100,357 | A | * | 3/1992 | MacCready et al. .......... 446/61 |
| 5,163,861 | A | * | 11/1992 | Van Ruymbeke ............ 446/35 |
| 5,170,965 | A | * | 12/1992 | Yasuda .................. 244/64 |
| 5,288,039 | A | | 2/1994 | DeLaurier et al. |
| 5,401,196 | A | | 3/1995 | Triantafyllou et al. |
| 5,899,408 | A | | 5/1999 | Bowers, Jr. |
| 6,082,671 | A | * | 7/2000 | Michelson ............. 244/72 |
| 6,206,324 | B1 | * | 3/2001 | Smith ................. 244/72 |
| 6,227,483 | B1 | * | 5/2001 | Therriault ............ 244/20 |
| 6,530,541 | B1 | * | 3/2003 | Woo et al. ............ 244/11 |
| 6,544,092 | B1 | | 4/2003 | Tomas |
| 6,632,119 | B2 | | 10/2003 | Chernek et al. |
| 6,783,097 | B1 | * | 8/2004 | Smith ................. 244/72 |
| 6,840,476 | B1 | * | 1/2005 | Raney ................. 244/11 |
| 7,007,889 | B2 | * | 3/2006 | Charron ............... 244/16 |
| 2002/0117583 | A1 | * | 8/2002 | Hamamoto et al. ....... 244/72 |
| 2003/0230672 | A1 | * | 12/2003 | Charron ............... 244/72 |
| 2005/0001091 | A1 | * | 1/2005 | Raney ................. 244/11 |

OTHER PUBLICATIONS

J.D. DeLaurier and J.M. Harris "A Study of Mechanical Flapping Wing Flight" Magazine Article—Aeronautical Journal Oct. 1993 pp. 277-286.

James D. DeLaurier "An Ornithopter Wing Design" Magazine Article—Canadian Aeronautics & Space Journal vol. 40, No. 1, Mar. 1994 pp. 10-18.

J. D. DeLaurier "Development & Testing of a Full-Scale Piloted Ornithopter" Magazine Article—Canadian Aeronautics & Space Journal vol. 45, No. 2 Jun. 1999 pp. 72-82.

Vezco T. Velkov "Basic Properties of the Flapping Wing and Features of the Flapping Flight" Internet Web Site http://www.geocities.com/eureka/boardroom/9483/main/htm pp. 1-5 no date.

Triantafyllou "An Efficient Swimming Machine" Magazine Article—Scientific American Magazine Mar. 1995 pp. 64-70.

Pornsin-Sirrak et al. "MEMS Wing Technology for a Battery-Powered Ornithopter" Magazine Article—Caltech Micromaching Lab, Pasadena CA.

* cited by examiner

FLYING DEVICE UTILIZING NATURAL PRINCIPLES

BACKGROUND OF THE INVENTION

In nature, many creatures are able to move through the air easily, gracefully and swiftly. Man has always dreamed of equaling this natural motion through the atmosphere, but to date has been essentially unable to do so. Birds, insects and even mammals are able to fly with flapping wings. Through eons of natural selection, fliers have developed advantages that make them highly capable and efficient at moving in air. Although the use of rotating propellers and jet action has allowed man to effectively move through air and therefore accomplish amazing things, a full understanding of the principles behind efficient flapping motion still eludes scientists.

A flapping flying device is presented herein, an ornithopter, which utilizes some of the principles perfected by nature through millions of years of evolutionary trial and error. Of course, all aspects of natural flapping are not addressed, since natural phenomena are complex and hold many secrets yet to be unveiled.

Some studies, as shown in the referenced prior art U.S. Pat. No. 5,401,196 indicate that propulsion by natural flapping motion, at least through water, is somewhat dependent upon vortices created by the flapping. Additionally, flapping propulsion is significantly more efficient than human methods of propulsion through fluids. The similarities between flapping in water for propulsion and flapping in air for propulsion suggest that the same principles are in effect. A vortex is created during a sweep in the fluid by a flexible foil which thereafter affects and provides impetus for a subsequent sweep of the wing or fin in the opposing direction. The instant invention utilizes this concept for propulsion of the device through air.

Human attempts to mimic the flapping motion of creatures have been for the most part unsuccessful. Flying devices as shown in the prior art U.S. Pat. No. 5,899,408 are such attempts. Most of these designs are not viable. Smaller ornithopters do fly, but at present do not compare in practicality to conventional propeller-driven aircraft.

The instant device for employing flapping motion for propulsion through air is both novel and unanticipated. It explains the heretofore mysterious success of movement by many flying and swimming creatures, A fundamental principle presented herein is that natural flapping utilizes a springboard-like highly elastic method to facilitate flapping and greatly conserve energy. Natural flapping of a wing or a fin is the action of a damped spring pendulum having a proximal end firmly communicated with the body of the organism and a distal end which elastically reacts with the fluid. This spring pendulum, or springboard, acts in a manner similar to a common diving board, wherein the distortion of the springboard in one direction stores potential energy which is released in a subsequent reverse movement. Once the wings are oscillating, the creature must add enough energy to overcome the damping caused by reaction with the fluid and energy losses due to internal friction. In an ideal situation, with no friction and in a vacuum, a single stroke would create an oscillation which would continue forever. Of course, friction does certainly exist, and reaction with air is necessary to keep an organism aloft, so a creature in nature is required to use muscle power to fly.

Observation of birds suggests that these organisms flap at a frequency unique to the creature. They seem to vary from this frequency only when acceleration is necessary, such as when starting, stopping and maneuvering. Additionally, organisms having larger wingspans flap at a lower frequency than smaller organisms, a characteristic which is further suggestive of a springboard pendulum since physics dictates that the period of vibration increases with the length of the pendulum. The springboard effect is somewhat disguised when observing these fliers, since soaring and accelerating conditions are common during the daily routine of the creatures. It is an effect which is, however, detectable during sustained flapping over long distances. It is also notable that minimal or no musculature is necessary at the wing extremities in the proposed flapping propulsion presented herein. The action of the wing is largely passive. An appearance of complex wing action is the result of reaction with the air of the various flexible wing elements. Forces on the elastic wing during the flap account for the changing angle of attack and shape of the wing, both sideward and rearward.

This natural spring pendulum effect conserves energy for the organism. Pivoted wings and pivoted fins such as described in much of the prior art referenced herein require energy to stop motion in one direction, then start up a reverse motion. This would be the case even in the frictionless vacuum of our example. This energy is lost on every stroke and significantly reduces efficiency. All of the referenced prior arts have this disadvantage.

Although most of the prior arts mention wing flexure, the described embodiments are substantially inelastic compared to the instant device. A large value for flexure as proposed herein is unanticipated in the prior art, as evidenced by the fact that the prior art suggests variability in the rate at which the wings are flapped. Conflict results when highly elastic wings are pumped at other than the natural frequency of the wings. They do not flap smoothly, but instead sustained pumping tends to create erratic, interfering vibration along the span with a reduction of distal end displacement. This effect is minimal and therefore obscured if the flexure is slight, as proposed by the prior art. The instant invention employs highly elastic wings operating at a singular natural frequency to increase efficiency.

A further distinction between the present invention and the prior art is that the prior art employs wings in hinged communication with the body of the device. The preferred embodiment of the present invention describes fixed attachment of the wings to the body. A hinged embodiment of the present invention is described as an alternative method to produce elasticity near the body of the device, but the device continues to operate as a springboard having high elasticity and therefore a singular natural frequency, which is unanticipated by the prior art. The utilization of elastic elements in the prior art is only suggested as an optional energy storing method as in the DeLaurier references. Elastic elements as suggested for use in the instant invention are also usable in conjunction with a firm connection of the wings to the body. This configuration is further distinguished from the prior art in that the hinges of the instant invention do not need to be adjustable sideward as in prior art DeLaurier wherein special hinges are designed to adjust translationally during pumping to effectively communicate a vertically moving panel with a pivoting panel. The referenced prior art of Bowers contains a similar problem.

Another novel element presented herein is illustrated as a bent configuration of the wing spar close to the point of fixed attachment to the fuselage. The wing spar is the principal resilient element providing elasticity to the wing. This crook configuration redirects the vertical forces produced during flapping into substantially horizontal forces. These horizontal forces are counteracted by the opposing forces produced by the other wing. This process substantially reduces the up and down movement of the fuselage which normally occurs in response to center of gravity changes caused by the flapping. It is proposed herein that birds have a similar bone structure which accomplishes the same task, the "wishbone" being the critical central element. None of the prior art suggests such a configuration and teach away from such a solution, since such a solution requires firm connection between the wings and body. Prior art DeLaurier shows a 3 part wing design that moderates such body oscillation. This aspect is therefore a further indication of the novelty of the instant device. Birds and other creatures fly utilizing the principles mentioned, whereby the actions of two wings provide impetus for forward motion and aerodynamic wing shape thereafter provides lift. The wings are fixedly attached to the body and act simultaneously at a singular flapping frequency. Although bird structure appears complicated, it is suggested herein that the "wishbone" is the fixed central element of the two wings, and thereby the point at which each wing is communicated. It is submitted that the "wishbone" provides much of the necessary resilience for flying, since it is typically observed to be flexible, it is of a shape which suggests flexibility, and it has a significantly larger cross sectional area than many other bones. It is also observable that there is minimal vertical oscillation of the body of birds during flight, a further indication of a springboard configuration such as proposed herein.

The natural frequency of the wings of particular flying organisms is dependent upon several factors. Span, surface area, wing shape and composition, flexure, and the density and viscosity of the air at any particular time are some of the determinants of an oscillatory flapping rate. It is submitted herein that increased velocity of birds in free flight is caused by an increased amplitude of the flap, not an increase in flapping frequency. Since a singular flapping rate is an important aspect of the instant device, methods for the determination of that rate are suggested. The prior art continually teaches a varying flapping rate in order to compare performance, and it is submitted herein that any pumping frequency other than the natural frequency reduces efficiency in a highly elastic device.

A natural spring pendulum works effectively only if the organism exerts a complementary force on the wings at a frequency matching the natural frequency of the wings. In much the same manner as pushing a person on a playswing or bouncing on a diving board, force must be applied in harmony with the natural frequency. If a repetitive force is applied at other than the natural frequency, conflict is created and energy is lost. Similarly, if muscular forces are applied at intervals other than the natural frequency in natural fliers, energy is lost. It may again be noted that the frequency is substantially independent of the distortion of the wing. During sustained flight, larger strokes maintain the natural frequency. This principle is fundamental to all types of pendulums, and was first observed by Galileo.

The concepts associated with natural spring pendulums are herein applied to flying devices. The pumping force may be applied by a variety of methods, including motorized and human means. Since application of the pumping force necessarily must be in synchrony with the natural frequency of the wings, a method by which a pumping means is activated at the correct time and in the correct direction is addressed. None of the prior art addresses this issue. A man-powered device would utilize the "feel" of the pendulum for applying the force. However, a completely mechanical device must successfully match the natural frequency. One method by which this may be accomplished is by sampling the wing motion, and thereafter switching the pump on and off with appropriate directional changes at the maximum displacements. This feedback process automatically adjusts for variations or interruptions in the flapping. Optionally, the wing frequency could be mathematically derived or experimentally determined and thereafter a pumping means with the desired frequency could be utilized during operation. The instant preferred embodiment illustrates a means to apply force to the wings which is similar to an escapement mechanism used in mechanical clocks. By this method, power is sympathetically applied to the wings at the correct time and in the correct direction, thereby facilitating the process and also saving energy. A further embodiment teaches a sampling and pumping means which is electrical. Such means to harmonically pump wings is not anticipated by any prior art. A problem of "backloading" as described in prior art by DeLaurier is eliminated if the pumping of the wings is in synchronous agreement with the natural movement of those wings.

Wing composition and design presented herein allows for flexible flapping and aerodynamic shape. The preferred embodiment describes a double aerofoil wing design having a flexible supporting spar with chords extending substantially perpendicularly. The structure is covered with a lightweight pliable plastic material. A molded wing embodiment is also suggested.

Wing structure of the instant device provides for flex not only in a spanward direction, but also rearward with respect to the direction of motion. The leveraged force on the trailing wing edges causes the wing structure to undergo pitching during each flap. This aspect will be discussed in the specification. Such flapping provides a substantially continuous rearward-directed reaction with air, thereby propelling the creature forward. Aerodynamic wing design causes lift when such forward propulsion is provided, allowing the bird to stay aloft. Additionally, a wing structure such as existent in birds approximates a class III lever wherein the proximal fixed end acts as a fulcrum, a pumping force is applied near the fulcrum, and thereafter a large distal-end distortion is created. A large distal displacement is especially advantageous for flying, since air has such a low viscosity. None of the prior arts showing high elasticity teach a pumping structure which applies a force between an end attached to the fuselage and an end that is free to elastically flap. This is a further distinction of the instant device from the prior art.

Wing shape is another distinguishing factor in flapping performance. By angling the nearer portion of the wing forward and the outer portion of the wing in a rearward direction, the flapping of the wing tips is directed more toward the rear, providing a greater displacement of air in that direction. In this manner, the common "V" shape of many bird wings directs the air more rearwardly, thereby increasing forward thrust.

Since the instant device presents a substantially passive, highly elastic wing which is driven by a force applied near an end proximal to the body, the weight of the wing itself causes a downward curvature. The wing therefore must be initially angled upward from the body to counteract this downward curvature to insure that the entire wing structure reacts with air substantially in a horizontal manner. This curvature is observed in many birds and is proposed in the instant device.

Wing flexure in the rearward direction is also important. This flexure is common in nature and is substantially produced by resilient feathers. Rearward wing edges are more pliable than leading edges since rearward wing tips are comprised of singular feathers having their most flexible parts exposed and substantially rearwardly directed. A flexibility gradient exists from front to rear whereby the wingtip feathers are oriented such that stems and barbules of the individual feathers are most pliant in a substantially rearward direction. Distal wing tip feathers of birds, for example, have stems which are directed more or less spanwardly, and have flexible surfaces which are created by a multiplicity of barbules extending from these stems. These wing tip feathers are asymmetric, with a wider, more elastic barbule surface directed rearwardly. The embodiments of the instant device describe such a flexibility gradient. Flexure of the rearmost elastic elements of the wing creates a secondary vertical elastic flapping effect which is slightly out of phase with the primary, spanward, frequency of the wing and reacts with vortices created by previous strokes thereby forcing air to the rear of the device and increasing leading edge suction.

The instant invention also addresses the importance of wing camber. In nature, bird wings are cambered to provide lift when propelled forwardly, a feature which has been successfully imitated by man in the design and construction of airplane wings. It is submitted herein that this camber produces an important secondary effect. Since the curvature is concave downward, as in a Roman arch, the wing is more resistant to flexure when moving downward and, conversely, flexes more readily when moving upward. Flapping, therefore, produces a reactive and powerful downstroke. Since the upstroke is thereafter more flexible, it does not generate the power that the previous downstroke produced and allows air to pass through with less resistance. Such unequal vertical flexure is therefore helpful in keeping the device aloft. The prior art of DeLaurier argues that downstrokes require significantly more power than upstrokes, and suggests that birds solve the problem by wing contraction or rest periods during upward strokes of the wing. It is suggested herein that the differential vertical flexure of highly flexible cambered wings, such as proposed in the instant device, substantially addresses this problem. Additionally, wing tips of birds have singular feathers which are individually cambered. Both the stems and the barbules of these feathers have a downward curvature. In a manner similar to the spanward wing surface, this cambering of wingtip feathers decreases resistance during the half-cycle upstroke of the wingtips and presents increased resistance during downstrokes, thereby creating a more powerful downstroke than upstroke. A further differential between downstrokes and upstrokes is caused by feather overlap and is addressed in the instant device. No prior art proposes such means to provide unequal powered strokes.

The prior art in this field does not show other novel aspects presented by the instant invention. Most of the prior art proposes hinged wings, a disadvantage already discussed. Prior art U.S. Pat. No. 5,899,408 shows a flying device designed to utilize a singular flexible wing. While this reference mentions harmonic oscillation in its operation, it varies significantly from the instant device in many ways. The reference does not firmly attach wings to the body of the device, but instead attaches a single wing, spanning both sides, to a powered armature pumping at a central location of the singular wing. The wing is therefore moveable with respect to the body of the device and therefore requires slots on the sides of the fuselage through which the wing may slide vertically during oscillation. The single wing concept of the reference does not anticipate the instant device because the instant device presents springboard wing structures which are immoveable at an end with respect to the body of the device while being driven up and down at a point outward of the body. Connection to the fuselage of the Bowers design would be difficult at best; possibly pivoted communication at the two nodal points along the wings thereby resulting in a design similar to the DeLaurier references. Additionally, U.S. Pat. No. 5,899,408 mentions oscillatory action, but thereafter does not describe means for accomplishing that action nor specify the existence of a singular natural frequency. Recognizing and producing such a unique natural frequency is not obvious. An important difference in the design of U.S. Pat. No. 5,899,408 from that of the instant device is that lift is provided by a valve structure on the wing surfaces which allows air to flow through the wings on upstrokes and thereafter precludes the same from occurring during downstrokes. The present device provides lift by the natural combination of flexible wing and wing tip cambering, overlap, and aerodynamic cross-sectional shape along with a forward impetus provided by large spanward distal displacement and flexible rearward reaction with air. Additionally, this reference does not teach a highly elastic wing construction, and teaches toward less elasticity by describing a desired unequal lift caused by a valved wing structure with substantially no rearward wing flexure. As mentioned previously, many features presented herein affect successful flapping propulsion, none of which are significantly addressed or suggested by U.S. Pat. No. 5,899,408 and therefore that prior art does not anticipate the many advantages of the instant device.

The prior art of Velkow recognizes the necessity for wing elasticity in both span (sideward) and chord (rearward) directions, but proposes various flapping rates and uses mechanical means to flex only the outer part of the wings. The wings are pivotable at the proximal end, and flexure is achieved at the distal end by means of an elasticized pulley mechanism which retracts and extends with the pumping of the drive mechanism. It is submitted herein that flexure of the wing is best acquired along the entire length, with springboard connection to the fuselage at the proximal end. Energy storage is important, and employing the entire wing for such storage is an aspect which is not obvious. Velkow also does not address the necessity for a singular pumping frequency associated with any particular wing which must be energized at that frequency, and therefore that prior art does not describe a means to acquire such a frequency. A further aspect which is not addressed in the Velkow references is the cambered flexibility of the wings and wing tips to attain differential half-cycle power. Lastly, Velkow does not teach a forward then rearward lateral wing design which is extant in the present device for improving rearward air displacement at the distal end of the wing.

The construction of the instant device is unobvious since one skilled in the art would be reluctant to build a device having highly flexible wings and which are not pivotable. It is likely that immoveable connection of a wing to the body has been overlooked since a primary consideration of a flapping device is to make the flapping less difficult, and firm connection initially seems to conflict with this concept. It is both unlikely and unobvious that consideration has been given to the advantages produced by a firm springboard connection of elastic wings to the fuselage. Therefore, most of the referenced prior art describes hinged connection, and because some success has been attained, a springboard configuration was not envisioned as being able to produce better results. It follows that consideration of frequency matching with respect to the natural frequency of the wing is not an obvious concept and the successes of fixed wing aircraft also tend to obscure the characteristics of effective elastic flapping flight.

The features of the instant device are submitted by the applicants to be novel and unobvious in light of the prior art. Additionally, the combination of the various elements of the device presented herein is also submitted as being unobvious and novel to those skilled in the art. Details of those various elements are given in the description of the preferred embodiment of this specification.

BRIEF SUMMARY OF THE INVENTION

In accordance with the present invention, a flying object, an ornithopter, utilizing flexible wings is propelled by flapping of those flexible wings at the natural frequency associated with the characteristics of the wings. The pliable wings are fixedly attached at a proximal end to the body of the device, creating a springboard, and a pumping means applies a repetitive force at a location which is relatively close to the proximal end of the wings. In this manner, a class III type lever is approximated, whereby a large displacement of the opposing distal end of the wing is created when a pumping force is applied. This large displacement causes flexible wing tips to react favorably with vortices to produce efficient forward propulsion. A flexible crook configuration is also described wherein vertical forces caused by wing flapping are converted to lateral forces, thereby reducing undesirable up and down movement of the body of the device.

Once maximally distorted, the wing contains a built up potential energy which it thereafter applies as a restoring force in an opposite direction and therefore each subsequent stroke requires a small pumping force from the energy source. A significant amount of energy is therefore saved during operation since the pumping force substantially only applies enough energy to overcome frictional losses. The free end of the wing is structured to maximally and directionally displace the fluid in order to propel the device in a forward direction. All of the elements of the device are designed to maximize lift and reduce drag.

Thrust means is described utilizing featherlike elements which produce a significantly flexible trailing edge of the wings. Several characteristics of the featherlike elements are described whereby air displacement is efficiently directed rearwardly.

The pumping means of the device is communicated with a switching means which permits the pumping means to act in the proper flapping direction and at the proper time to insure that the pumping force is applied to agree with the unique natural frequency of the wings. The switching means does this by receiving feedback from the movement of the wing, and reacting when the wing changes direction, which also substantially corresponds to maximum distortion from equilibrium.

A further novel concept presented herein and observed in nature is that of camber of not only the entire wing structure, but also individual trailing edge elements. This camber in conjunction with overlapping of featherlike elements, not only produces needed lift while being propelled in a forward direction, but also creates a differential flexure between downstrokes and upstrokes, whereby a downstroke is significantly more powerful.

It is proposed herein that the structure and principles involved in the invention are the very same structure and principles that have evolved in animals over millions of years to allow efficient movement through fluids.

DETAILED DESCRIPTION OF PREFERRED EMBODIMENT

The instant device uses the natural principles for propulsion of organisms through fluids which have developed over millions of years of evolution. The device is an ornithopter which utilizes a combination of aspects of natural flight recognized through observation and experimentation of flapping propulsion to create such motion in man-made objects through air. Concepts presented herein relate to movement of creatures, such as birds, in air during periods of efficient powered flapping.

Figure 1:
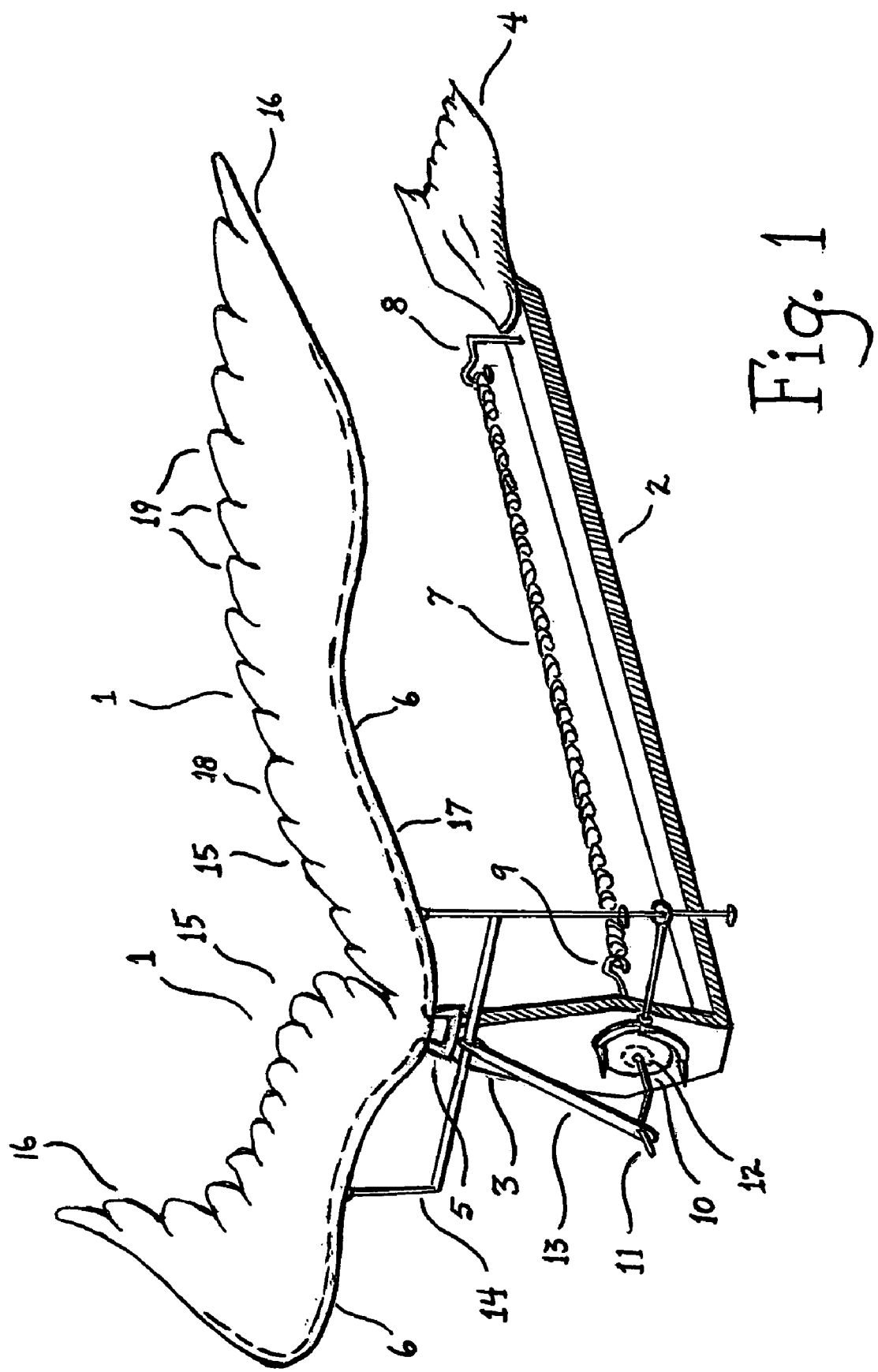
FIG. 1. An illustration of a rubber-band powered ornithopter embodiment of the present device FIG. 2. A bird feather showing camber of shaft and barbules FIG. 3. A cross sectional-view of feather showing camber of barbules FIG. 4. A dorsal view of a bird wing showing structure and relative positioning of wingtip feathers FIG. 5. A cross-sectional view of a feather showing effects of reaction of vanes with air during a downstroke FIG. 6. A cross-sectional view of a feather showing effects of reaction of vanes with air during an upstroke FIG. 7. A dorsal view of a wing showing overlap FIG. 8. A cross-sectional view of adjacent wingtip feathers during an upstroke, showing torsion effects on reaction with air FIG. 9. A cross-sectional view of adjacent wingtip feathers during a downstroke, showing torsion effects on reaction with air FIG. 10. A sectional view of wing of device showing structural components FIG. 11. A sectional view of wing of device showing an alternative embodiment of structural components forming framework FIG. 12. A cross-sectional view of typical wing design FIGS. 13 through 17. Cross-sectional views of wing shape and vortices produced at certain stages during a downstroke FIG. 18. A dorsal view of a wing of the device showing a "V" configuration and resulting reactive areas of featherlike elements FIG. 19. A view of a flexible L-shaped elongate structure showing movements when synchronously pumped FIG. 20. A frontal view of the device showing curvature of wings FIG. 21. A sectional view of the device showing mechanisms involved in synchronous pumping of wings FIG. 22. An embodiment of the device showing electrical means to pump wings in synchrony with the distinct natural frequency of the wings FIG. 23. A view of a man-powered embodiment of the device FIG. 24. A sectional view of an alternative embodiment of a springboard structure for the instant device FIG. 25. A sectional view of a crook as part of spar in firm connection with body FIG. 26. A sectional view of a reverse crook as part of spar in firm connection with body FIG. 27. A sectional view of a crook showing use in prior art

A preferred embodiment of the flying device is illustrated in FIG. 1. A lightweight ornithopter is propelled through the air by flapping motion of two flexible wings 1 connected fixedly to body 2 at vertical body extension 3 and stabilized in typical aerodynamic fashion by a rearward tailpiece 4. Wing crook 5 is a sharply curved portion of wing spar 6. Spar 6 is a highly elastic elongate extending internally along the span of wings 1 and supplies a substantial amount of flexure to the wings 1. Wing crook 5 redirects vertical forces into substantially horizontal forces on body 2 when wings 1 oscillate. Although wing crook 5 is not necessary for successful operation of the device, it reduces the undesired tendency for body 2 and associated connecting elements to move up and down during flight.

Elastic band 7 provides pumping power when twisted and then released. Elastic band 7 is stretched astride body 2 and fixedly attached to rear hook 8, which is offset from body 2 such that elastic band 7 is free to rotate without interference from body 2. At the forward end, elastic band 7 communicates with crank hook 9 which is part of crank mechanism 10 and is rotatable. Crank 11 is the forward extension of crank mechanism 10 and communicates with other components to transfer vertical pumping power to the wings 1. Wings 1 are made of lightweight resilient materials and will be described in more detail. Crank mechanism 10 extends from crank hook 9 through a hole in vertical body extension 3. Washer 12 provides low friction contact between crank mechanism 8 and vertical body extension 3, which allows crank mechanism 10 to rotate with a minimal amount of friction. Crank 11 is elbowed to rotatably accommodate conrod 13 so that rotational motion of crank 11 is changed to a push-pull movement necessary to pump wings 1 up and down. Conrod 13 pivotably communicates with a central location of flexible wing pumping structure 14 comprised of lightweight flexible material which communicates with wing spar 6 and forces flexible wings 1 up and down as crank 11 is rotated by elastic band 7. Communication of wing spar 6 and wing pumping structure 14 is made at a location proximal to vertical body extension 3.

Two flexible wings 1 are fixedly attached to vertical body extension 3 and project substantially laterally from vertical body extension 3 on each side. In this embodiment, therefore, wings 1 are unable to move translationally with respect to body 2. FIG. 1 illustrates connection of a singularly formed wing spar 6, but it is obvious that wings may be separately fixedly attached to vertical body extension 3 and achieve similar results. Wing pumping structure 14 communicates with each flexible wing 1 at a location nearer to proximal wing area 15, than to the free distal wing end 16. A small displacement at proximal wing area 15 results in a large vertical deflection of distal wing end 16 and a significant restoring force is produced in an opposing direction. This configuration creates a class III type lever wherein displacement is gained at an end opposite to the fulcrum as force is applied between the fulcrum and the opposite end, but nearer to the fulcrum. Since wing 1 is highly elastic, a further increase in vertical displacement of distal end 16 is realized.

Means for upward and downward pumping of the flexible wings 1 is therefore created by the release of energy from elastic band 7 and thereafter the linkage of crank mechanism 10, conrod 13, flexible wing pumping structure 14, and wings 1.

As flexible wing spar 6 and therefore leading edge 17 of flexible wing 1 are synchronously pumped up and down, trailing edge 18 of flexible wing 1 creates a sympathetic rearward displacement of air. Since flexible wing 1 is deflected more at distal wing end 16, the air displaced is greater in volume at this distal wing end 16. Trailing edge 18 is rearmost part of flexible wing 1 and is more pliable than leading edge 17. It is desirable to have a very bendable trailing edge 18 to more effectively displace air from the trailing edge 18 toward the rear. The action of rearward air displacement creates a reaction in the forward direction causing forward propulsion of the device. Forward motion, along with aerodynamically contoured wings 1 creates the necessary lift of the device. Trailing edges 18 may be structurally continuous, but are herein illustrated as having separate elastic trailing featherlike elements 19, with characteristics similar to feathers on birds.

Figure 2:
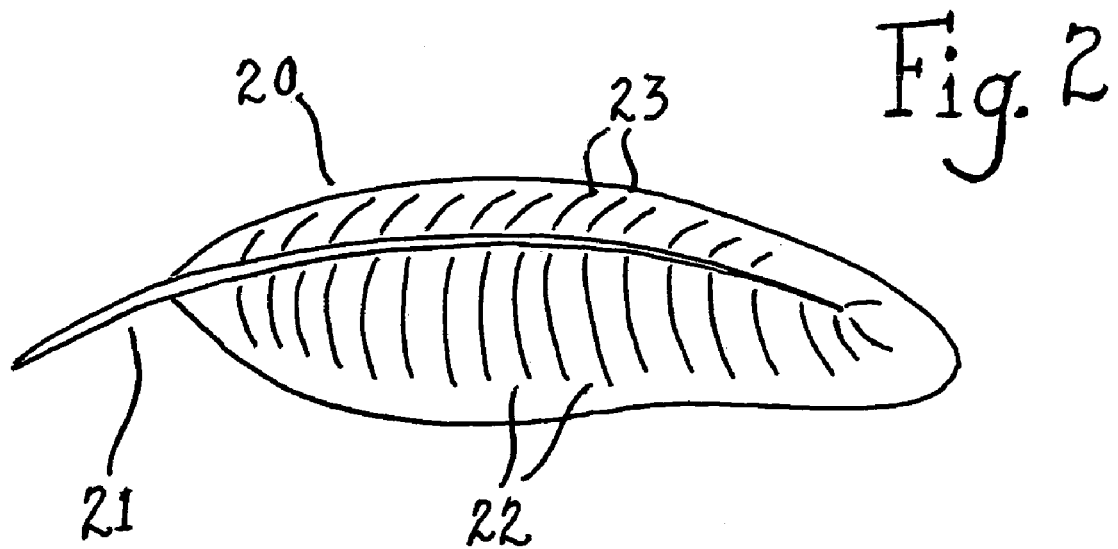
Figure 3:
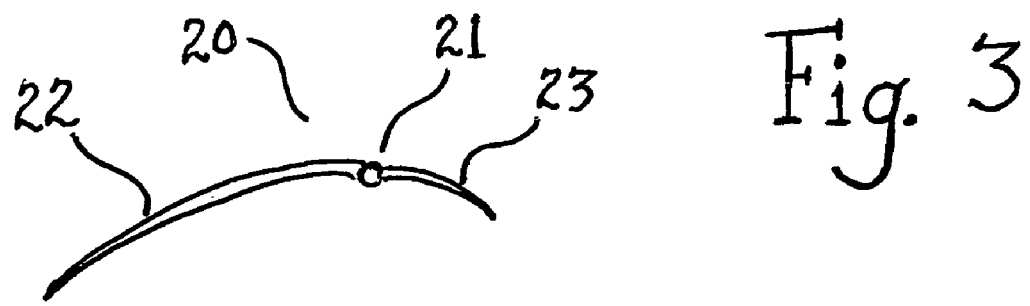

Because the instant invention utilizes structural properties of flying creatures, a description of those properties aids in description of this device. It is observable that bird feathers are differentially elastic elements, and their structure is the result of evolutionary success. As shown in FIG. 2, not only are they flexible longitudinally, in the direction of the shaft, but pliancy also exists in barbules at substantially right angles to the shaft. FIGS. 2 and 3 illustrate two views of a wingtip feather having a shaft 21 with barbules 22 and 23 projecting from either side. FIG. 2 shows shaft 21 has a downward camber, therefore it is easily bendable downward. Barbules 22 and 23 also have a downward camber as shown in FIG. 3, which is a cross sectional view of wingtip feather 20. Barbules 22 and 23 are also more easily bent downward. In this respect, therefore, feathers are differentially flexible, bending more easily one way than the other. Through wing structure and feather layering, bird wing flexure forms a flexibility gradient having more pliancy toward the rear. Singular feathers are most flexible, and are positioned at the wingtips, where the most flexure is desirable. Flexibility decreases forwardly as feathers are compounded toward the leading edge. Wings and wing feathers flex more readily downward than upward due to a downward camber, implying that forces produced on wings during downstrokes and gliding periods require a more rigid wing response. An important aspect to this differential reactivity with air is that the bird does not have to substantially do anything special in terms of muscle activity or angle of attack to accomplish a more reactive downstroke. Merely flapping up and down creates the difference.

Wingtip feather placement and orientation on birds along the trailing edge is such that the most flexibility on individual feathers is substantially directed rearward. Flexure of bird wing trailing edge is dependent upon many factors, including shaft and barbule flexure, shaft and barbule camber, dimension and shape of reactive surface areas, shaft torque, and velocity of the feather with respect to air. On birds, wingtip feather placement and orientation along the trailing edge is such that the combination of these factors produces flexible reaction of individual feathers in substantially the rearward direction. It is observable that wingtip feathers point in a more lateral direction proceeding distally along the trailing edge. Construction of individual feathers, therefore, differs according to placement along the wing. Typically, toward the distal wing ends, feathers show a more significant difference in surface area produced by barbules 22 and 23 on either side of the shaft with the longer more pliant barbules 22 facing rearward.

Figure 4:
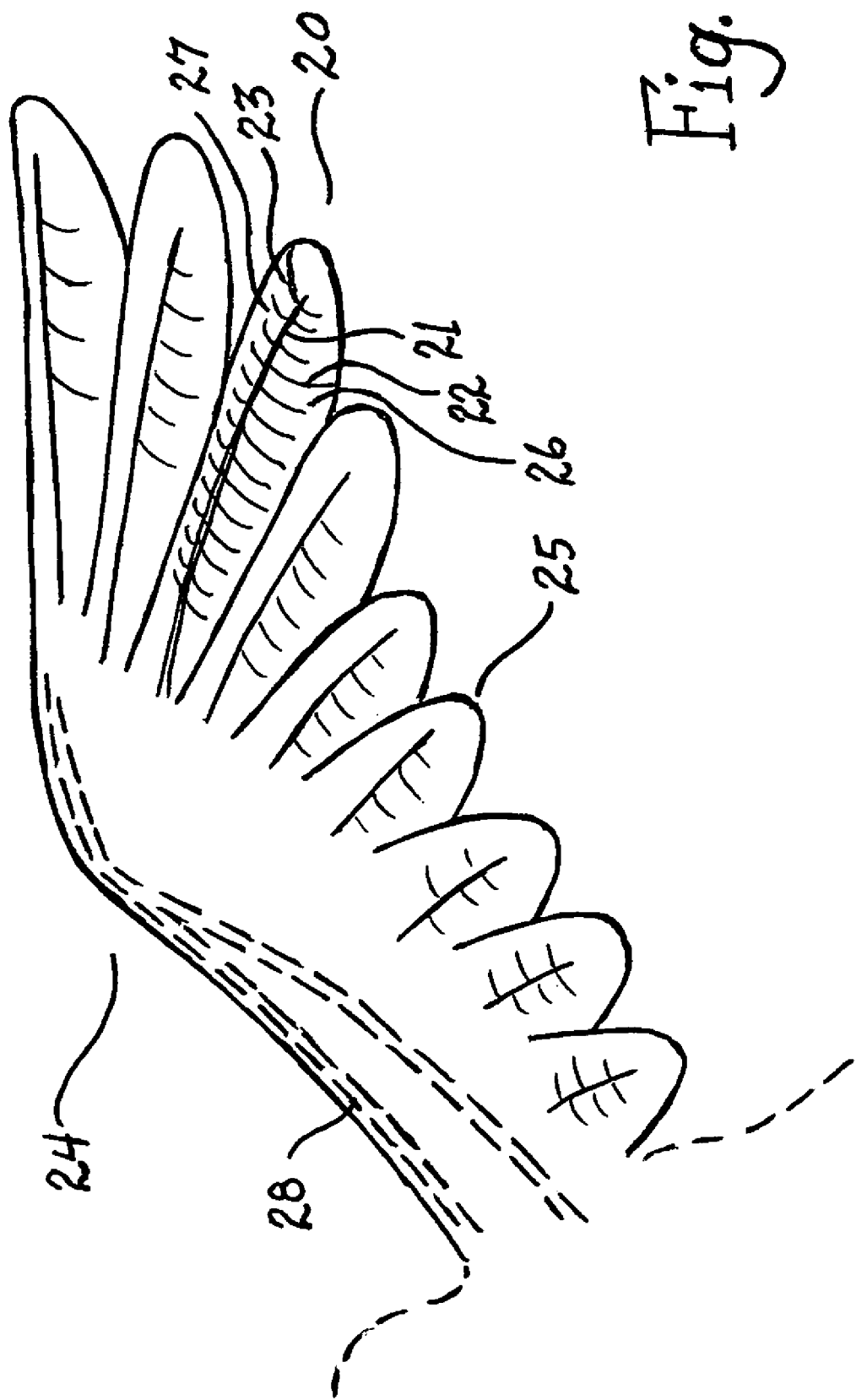

Accordingly, an example of a bird wingtip feather is presented in FIG. 4, wherein wingtip feathers vary in design and position along the trailing edge. Wingtip feather 20 has a downward cambered shaft 21 which extends from bird wing 24 at an angle dependent upon the position along bird wing trailing edge 25. A multiplicity of downward cambered barbules 22 and 23 extend laterally from shaft 21 to form vanes 26 and 27 on either side of shaft 21. Primary vane 26 is composed of longer primary barbules 22. Secondary vane 27 is composed of shorter secondary barbules 23. Primary vane 26 is more flexible than secondary vane 27 since longer primary barbules 22 are leveraged to a greater degree when force is applied. Leverage considerations also suggest that primary vane 26 exerts a greater torque upon shaft 21 than does secondary vane 27 for a given applied force. Primary vane 26 is positioned rearwardly of secondary vane 27 to provide flexibility in the rearward direction. A substantial portion of primary vane 26 is unsupported and exposed in this rearward direction. A further flexure of wingtip feather 20 is produced as shaft 21 is unequally torqued by leveraged force caused by the more reactive primary vane 26. Additional trailing edge distortion is produced as elastic support bones 28 are twisted during flaps. Feather flexure, in conjunction with this torqued flexure of the entire bird wing 24 creates a substantially united bending trailing edge 25 which produces a significant rearward displacement of air during flaps. The feathers along bird wing trailing edge 25 are individually designed and positioned to produce maximum rearward flexure, and the combination of these wingtip feathers creates a consistent and efficient rearward trailing edge flexure.

Figure 5:
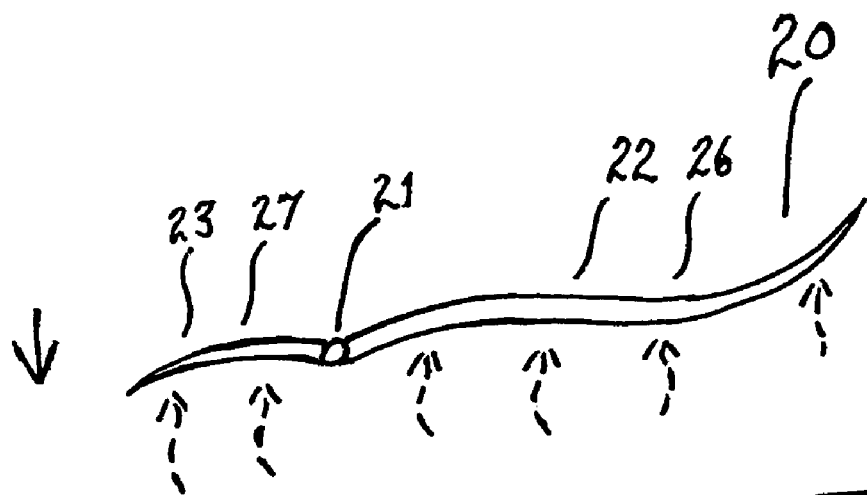
Figure 6:
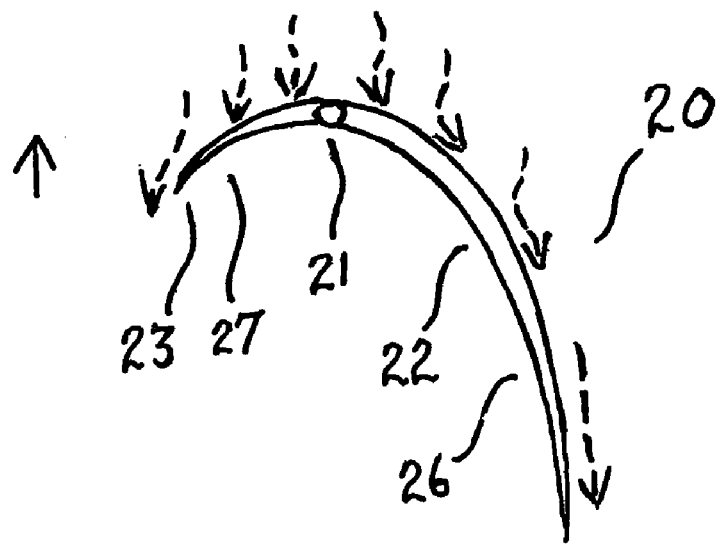

A further property possessed by wing tip feathers 20 is differential reactivity with air during upward and downward strokes of bird wing 24 caused by the combined effects of cambering and overlap. As previously addressed, both shaft 21 and barbules 22 and 23 are cambered downward. This cambering produces a rigid downstroke, since such a concave structure is more resistant to upward distortion. Instead of bending easily during a downstroke, cambering causes the element to resistively react with the air by spreading out, forming a larger surface area. Conversely, an upstroke presents a surface which bends willingly. FIG. 5 illustrates a cross section of wingtip feather 20 during a downstroke, wherein wingtip feather 20 spreads out. Barbules 22 and 23 bend upward, thereby increasing surface area during reaction with air. Reacting air is represented as dashed arrows. Primary vane 26 is shown flexing more than secondary vane 27. Conversely, FIG. 6 shows the cross section of a wingtip feather 20 during an upstroke. Barbules 22 and 23 are more pliable downward and therefore bend to allow air to pass by more freely. Differential flexure also exists for the feather shaft 21 and the entirety of bird wing 24, since these structures are similarly cambered. The camber of bird wing 24, shafts 21, and barbules 22 and 23, creates a combined effect for the bird which not only provides lift during flapping and gliding, but produces strong downstrokes and less reactive upstrokes. This is a desirable property to keep the bird aloft that exists in the instant invention.

Figure 7:
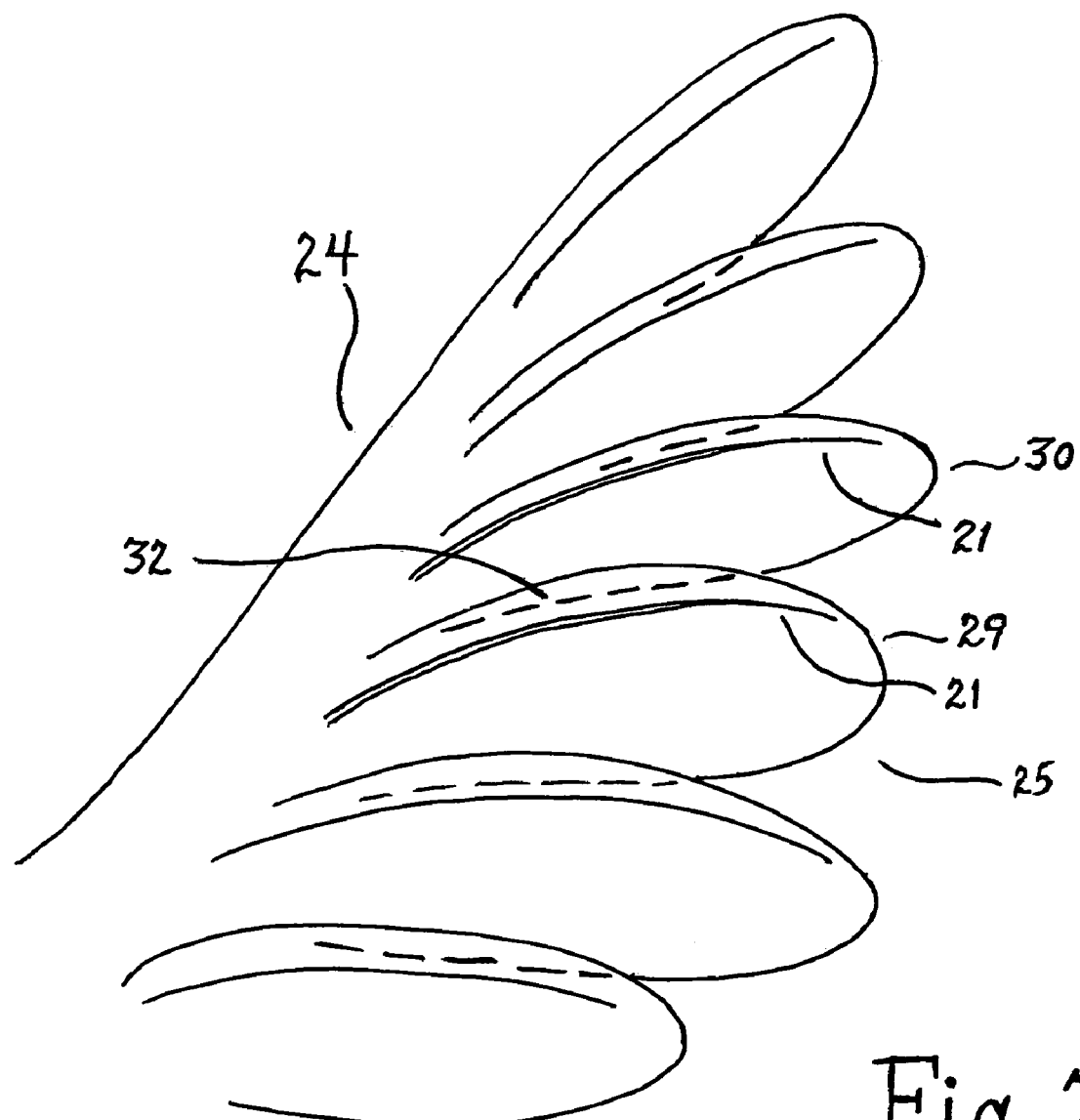
Figure 8:
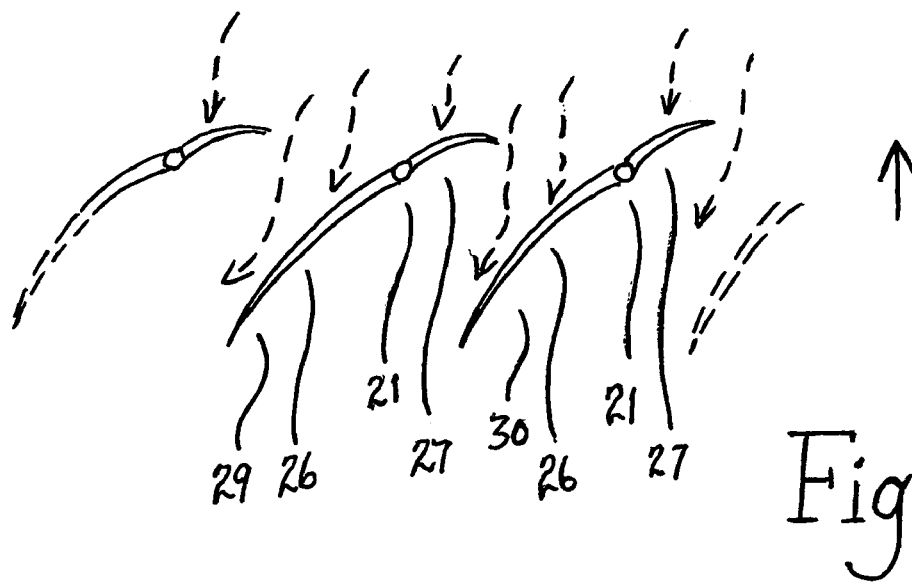
Figure 9:
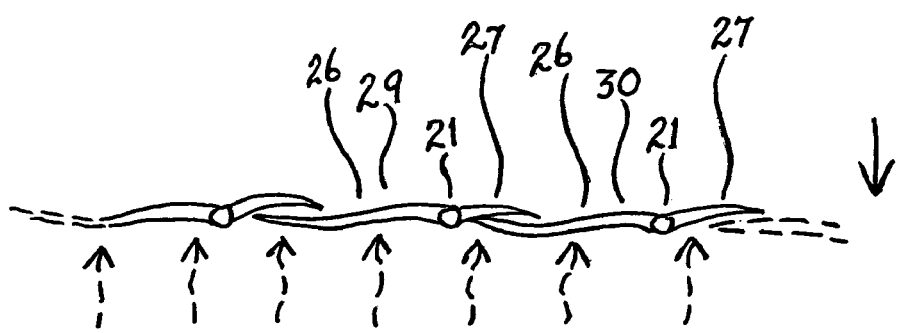

As shown in FIGS. 7, 8, and 9 bird wingtip feathers 20 are differentially resistive to air passage during downstrokes and upstrokes due to the combined effect of overlap of adjacent wingtip feathers 29 and 30 and the twist of the shafts 21. FIG. 7 illustrates a bird wing as viewed from above, or dorsally. Bird wing 24 has bird wing trailing edge 25 comprised of a multiplicity of adjacent wingtip feathers 29 and 30. Proximal adjacent wingtip feather 29 overlaps distal adjacent wingtip feather 30 such that a distally positioned adjacent wingtip feather 30 is partially underneath its more proximal neighbor. This is shown as vane overlap area 32. The result of such overlap is seen in FIG. 8. During an upstroke, adjacent feathers 29 and 30 bend more easily due to camber. Shaft 21, and therefore attached vanes, is also twisted during an upstroke because primary vanes 26 are leveraged more than secondary vanes 27 due to their greater surface area. This twisting effect produces openings allowing easy passage of air between adjacent feathers. Conversely, a downstroke causes vanes 26 and 27 to widen and twist causing them to communicate with adjacent feathers 29 and 30 in a manner which prevents passage of air. Less flexible secondary vanes 27 overlap more flexible primary vanes 26 of adjacent feathers, preventing twist of shaft 21 and thereby creating a unified, substantially strong and pliable continuous surface. Air does not easily pass through this configuration, and produces a powerful downstroke. The net effect of this structure is similar to self-adjusting louvers, which pivot to allow air to flow in one direction, but restrict flow in an opposing direction. It is notable that overlapping is not present for the entire length of wingtip feather 20, allowing the exposed distal end to exhibit greater flexure.

Figure 10:
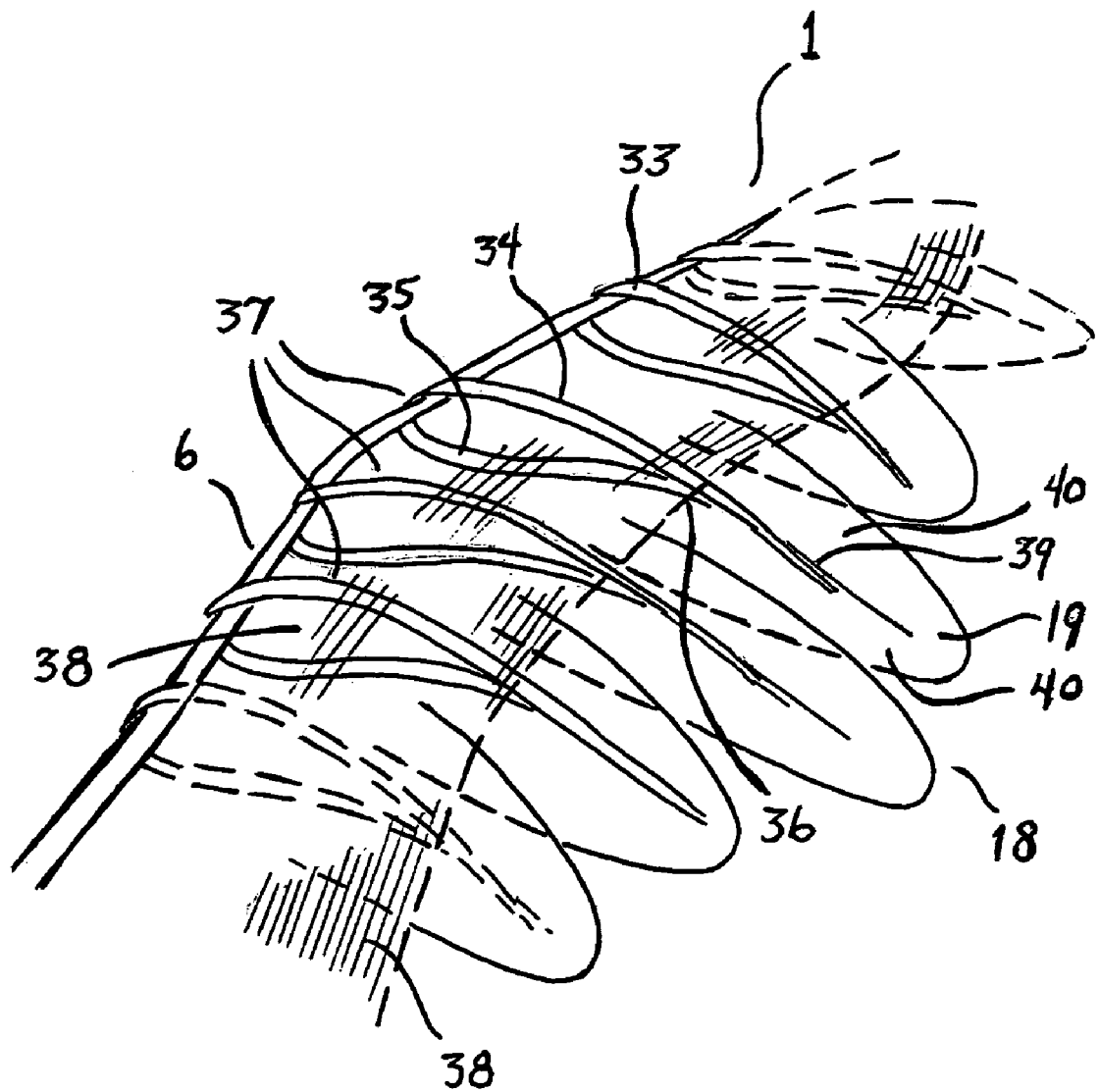

In keeping with the observed properties of birds' wings, this invention uses similar construction to produce similar results. As illustrated in FIG. 10, a wing embodiment of the instant ornithopter, struts 33 are flexible, curved, and lightweight elongates which are forwardly connected to wing spar 6 and extend both under and over wing spar 6 rearwardly. Upper strut component 34 and lower strut component 35 form supports for a double aerofoil configuration by connecting to each other at a juncture 36 located somewhat rearward. The combined curvatures of upper strut component 34 and lower strut component 35 form the familiar cambered wing cross sectional shape. A multiplicity of struts 34 and 35 form a framework 37 which is covered by a lightweight pliable material, such as Mylar, to form a smooth wing membrane 38. Strut extension 39 projects a distance rearward of juncture 36 and is twistable and cambered in a manner similar to that of a feather shaft. Attached to strut extension 39 are featherlike cambered vanes 40 which extend sideward from upper strut extension 39 to produce a separate featherlike element 19 having a reactive surface with areas and properties similar to a surface found in birds' wingtip feathers. Featherlike vanes 40 vary in surface area, directionality, and shape in accordance with principles applying to wingtip feathers of birds as discussed. Furthermore, featherlike elements partially overlap in a manner similar to that of bird wingtip feathers. The combined effect of all separate featherlike elements 19 creates a trailing edge 18 having a differential flexure substantially like flexure found in birds' wings.

Figure 11:
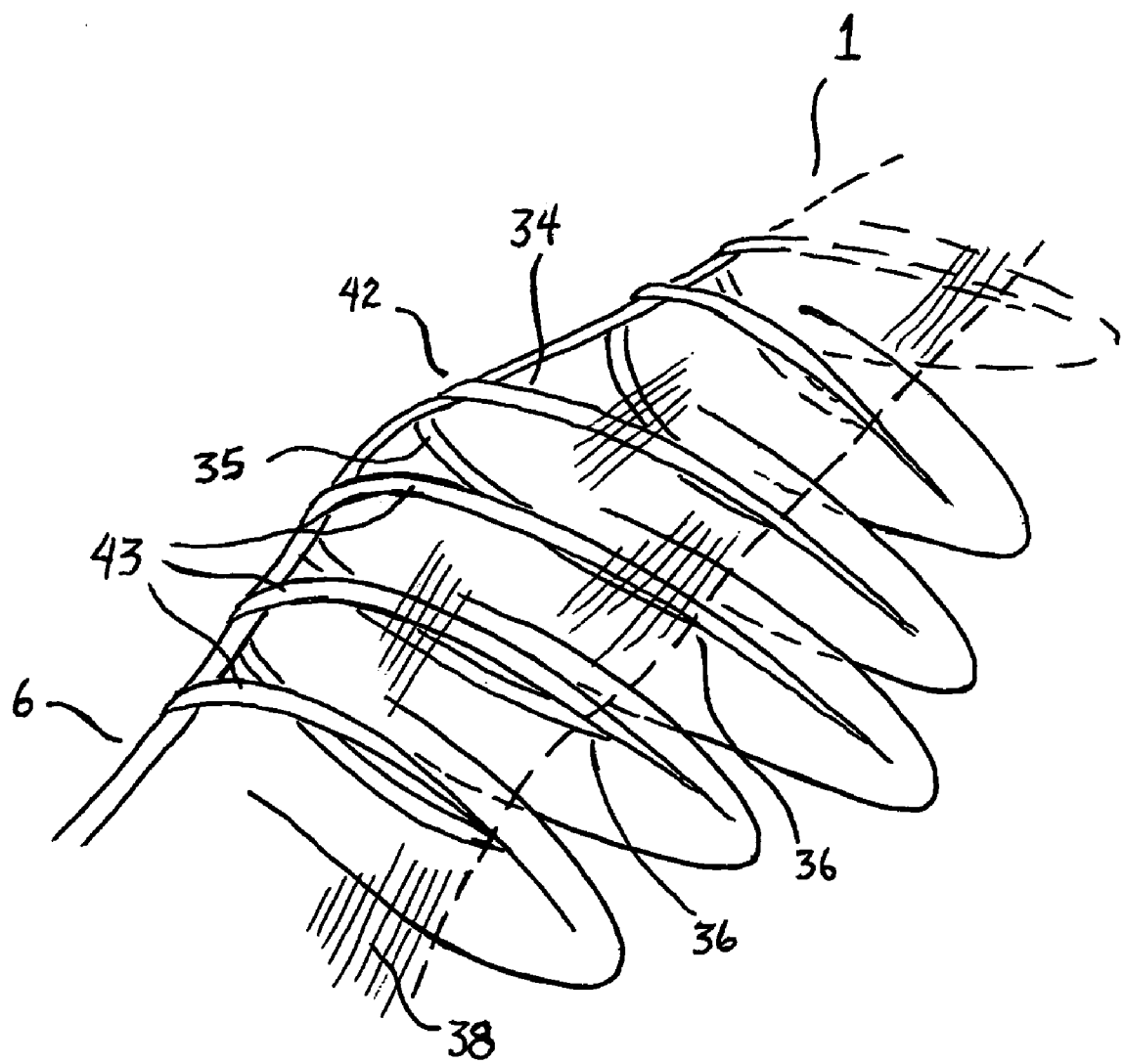

A further embodiment of a double aerofoil design for wing 1 is illustrated in FIG. 11 in which lower strut component 35 is connected to an upper strut component 34 of adjacent strut 42 at juncture 36, forming a more united forward framework 43 of wing 1. In these structural designs, chordwise flexure of wing 1 causes torque upon wing spar 6, and thereafter a rearwardly directed flapping frequency which is slightly out of phase with the frequency of wing 1 itself. The familiar undulating wing motion in birds is produced in this manner.

Although the preferred embodiments of the instant device describe a hollow double aerofoil wing design, it is proposed that materials exist by which a substantially singular molded design may be constructed having the same features as presented herein.

Figure 12:
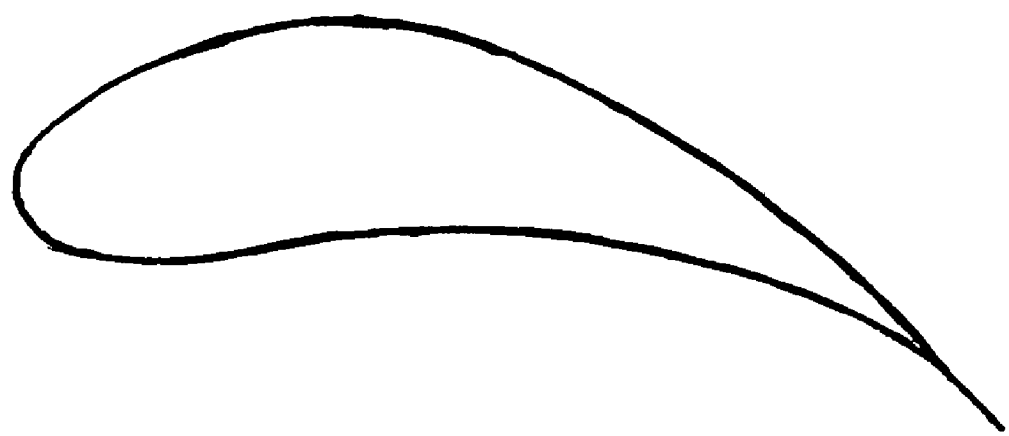

Thrust caused by flapping in the instant device is created by combination of the principles previously described, and this thrust produces lift when the wing 1 is cambered and aerodynamically shaped. FIG. 12 illustrates a cross section of a wing shape essentially first proposed by the Wright brothers in their pursuit of fixed wing human flight. After observing repeated failures using conventionally accepted wing designs of their time, their contrarian design was determined empirically and suggested that wing thickness be maximized about ⅓ of the distance back from the leading edge, followed by a taper to the trailing edge. This design was derived by ingenious experimentation, and has proven to be so effective that it has not appreciably changed since inception. The cross sectional shape of a bird wing agrees favorably with the Wright design. The wing embodiments of the instant device substantially utilize this aerodynamic wing shape to supply necessary lift.

A cross sectional illustration of the action of the wings 1 is shown in FIGS. 13 through 17, wherein several sequential positions of a wing during a flap demonstrate flexure of the trailing edge, creating a greater rearward reaction with air than would occur in a wing having a trailing edge of more rigid design. It is submitted herein that vortices of air created in strokes react with subsequent strokes in a manner similar to the process described in the referenced prior art of Triantafyllou describing reaction of fish fins with water. Air, since it is a fluid having a lower viscosity and density than water, produces vortices having different properties than those created in water, but the principles and effects remain the same. An additional difference between fish fin flapping and bird wing flapping is the considerable effect of gravity in flight, whereas water propulsion is essentially a weightless endeavor. Differential downstroke and upstroke power helps to counteract the gravitational effect. Repetitive flapping of wings in air does, however, create vortices which react with subsequent flaps in a constructive propulsive manner. Increased thrust is accomplished substantially by increasing the amplitude of strokes, thereby increasing the volume of air displaced rearwardly.

Figure 13:
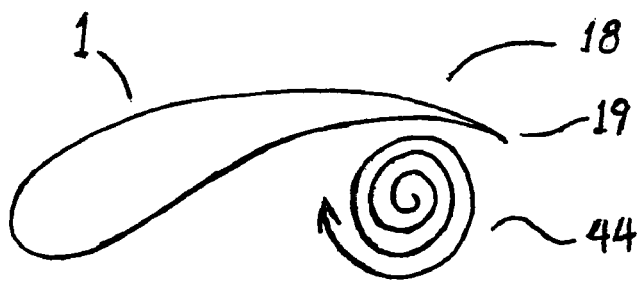
Figure 14:
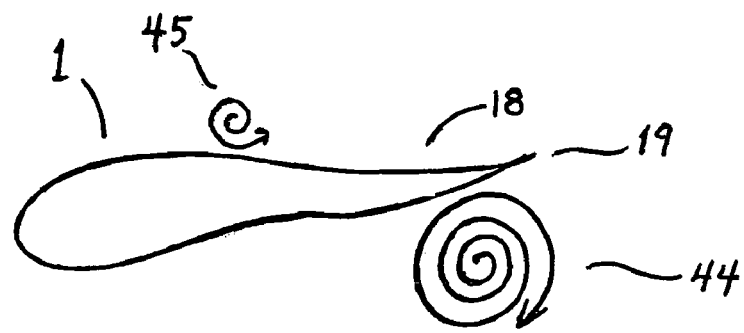
Figure 15:
Figure 16:
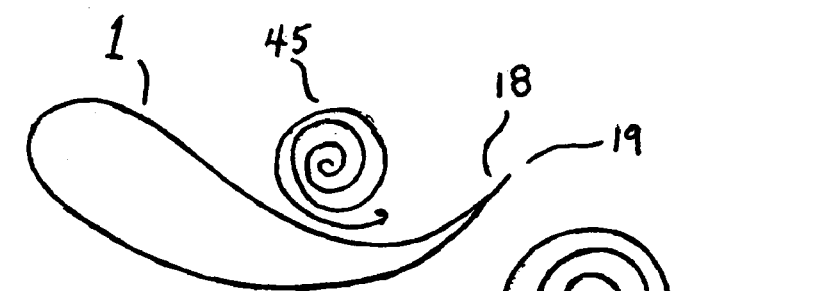
Figure 17:
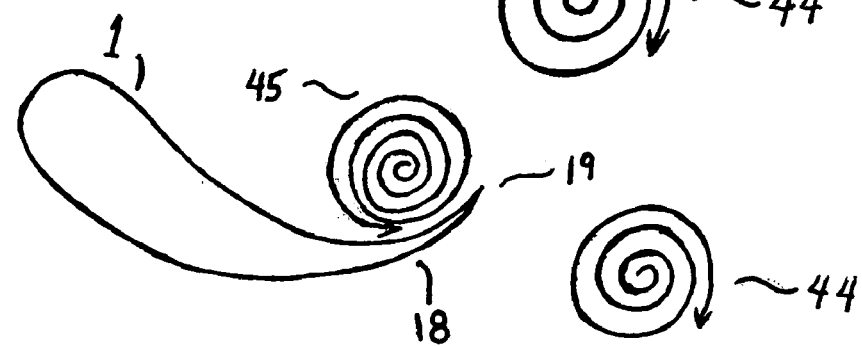

FIGS. 13 through 17 illustrate incremental positions of wing 1 during this downstroke, and show the associated vortices produced. In FIG. 13, a cross section of elastic wing 1 having trailing edge 18 is shown deflected maximally vertically, just before beginning a downstroke. A large clockwise vortex 44 has been produced beneath wing 1 by a previous upward stroke which will react with trailing edge 18 of wing 1 during downstroke. FIG. 14 illustrates a straightening of trailing edge 18 as it initially reacts with clockwise vortex 44 when downstroke begins. A small counter-clockwise vortex 45 begins to form above wing 1. As downstroke continues in FIG. 15, clockwise vortex 44 moves rearwardly and continues reacting with pliant trailing edge 18, and counterclockwise vortex 45 becomes larger and also moves rearwardly. FIG. 16 shows downstroke near completion wherein clockwise vortex 44 has moved significantly rearward of wing 1 and therefore minimally reacts with trailing edge 18. Counterclockwise vortex 45 continues to increase in size while moving rearward. Wing 1 is maximally deflected downward in FIG. 17 and counter-clockwise vortex 45 is at a maximum magnitude. A subsequent upstroke of wing 1 will react with this counterclockwise vortex 45. The process is then ready to repeat. In this manner, the reaction of trailing edge 18 with air simulates actual bird wing motion, particularly if this includes the action of differentially flexed featherlike elements 19 comprising trailing edge 18 as previously discussed. It is submitted herein that a wind tunnel test for observing reactions between flapping wings and vortices produced must be done such that the vortices produced are able to move rearward as occurs during flight. Therefore the thrust of the flapping wing must at least equal the drag for effective investigation of the phenomena. It is also notable that a synchronous pumping of a wing will be out of phase, about ¼ cycle, with the trailing edge oscillation produced.

Figure 18:
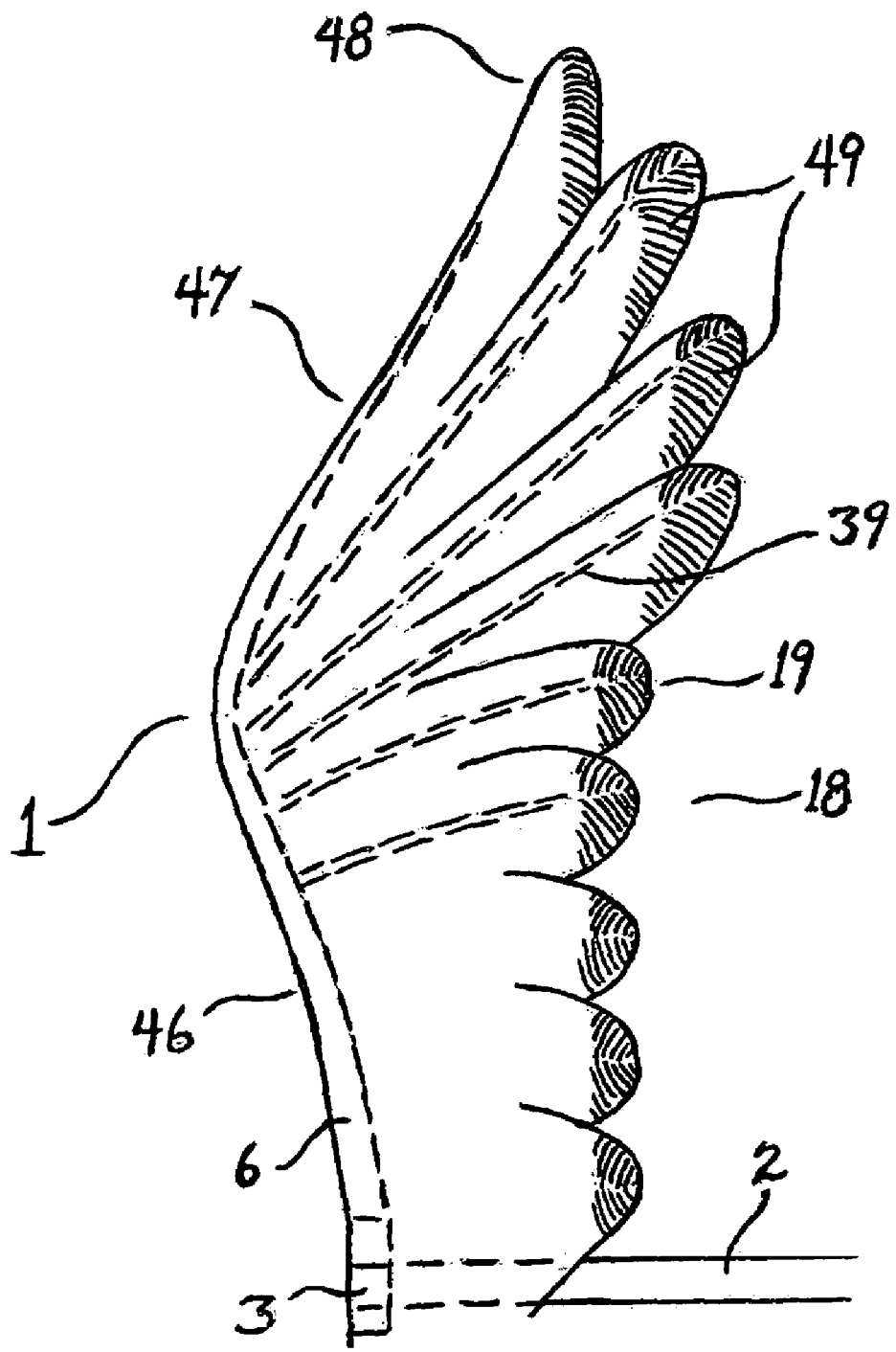

The preferred embodiment described herein utilizes another observable characteristic that creatures have for natural flight. In some birds, a lateral curvature of the wings proximally forward and thereafter distally rearward creates a more rearwardly directed displacement of air. This forward and rearward wing structure creates the familiar "V" or a curved wing design. FIG. 18 shows an overhead view of wing 1 of the device having an inner segment 46 and an outer segment 47. Because a first, aerodynamic but relatively stationary, inner segment 46 projects forward, an outer segment 47 of wing 1 will flap more directionally rearward, creating a greater displacement of air in that direction, thereby providing increased forward thrust. The synchronous flapping of elastic distal end 48 provides a means for flexured reaction of featherlike elements 19 in a rearward manner. Reactive areas 49 of featherlike elements 19 are shown as hash-marked portions and are substantially the rearmost parts of featherlike vanes 40. Reactive areas 49 vary in location on individual featherlike elements 19 along trailing edge 18 because of the varying angular orientation of each strut extension 39 with respect to the direction of motion of the device. A greater forward thrust is created, thereby improving efficiency of the device. The most reactive part of wing 1 is the outermost segment, since the deflection of this area is so relatively large, and a curvature such as described increases the amount of air displaced rearwardly.

Figure 19:
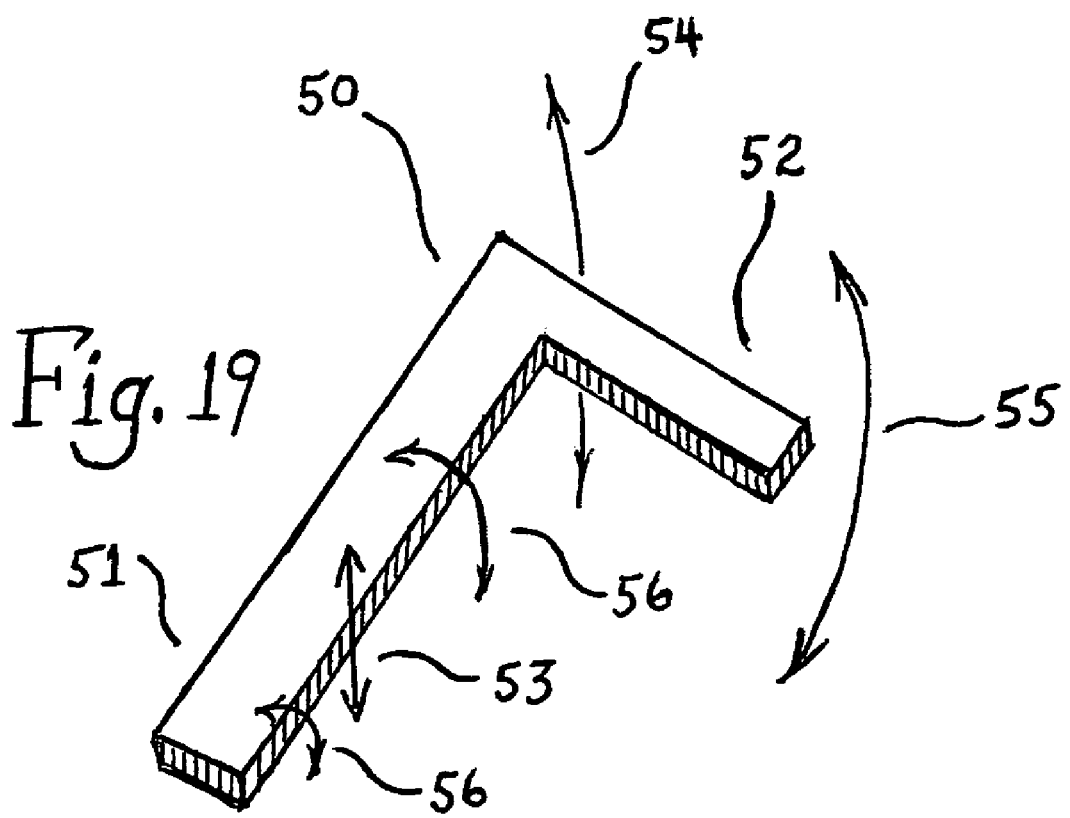

FIG. 19 illustrates this principle by which a bent wing creates a more rearward flap. An L-shaped elastic elongate structure 50 is pumped up and down at a near end 51 causing far end 52 to sympathetically flap. Since far end 52 is oriented somewhat perpendicularly relative to near end 51, near end 51 undergoes a torque caused by the leveraged momentum of far end 52. Both near end 51 and far end 52 are flexible, so elastic elongate 50 is made to flap at a singular natural frequency in which the flapping of far end 52 is directed perpendicularly with respect to near end 51. In addition to the normal flexible up and down flapping, near end 51 experiences a flexed twisting motion in this configuration and applies a significant restoring force to the perpendicular distorting movement. Pumping as represented by pumping arrow 53 causes a deflection of near end 51 shown by primary deflection arrow 54. Perpendicular action arrow 55 represents a larger distortion of far end 52 which causes twisting flexure on near end 51 as shown by torque arrows 56. A singular natural frequency for such damped motion of a curved elongate exists, and pumping at this natural frequency maximizes efficiency. The preferred embodiment of the device has such a curved wing shape and the device is pumped at an efficient natural frequency.

Figure 20:
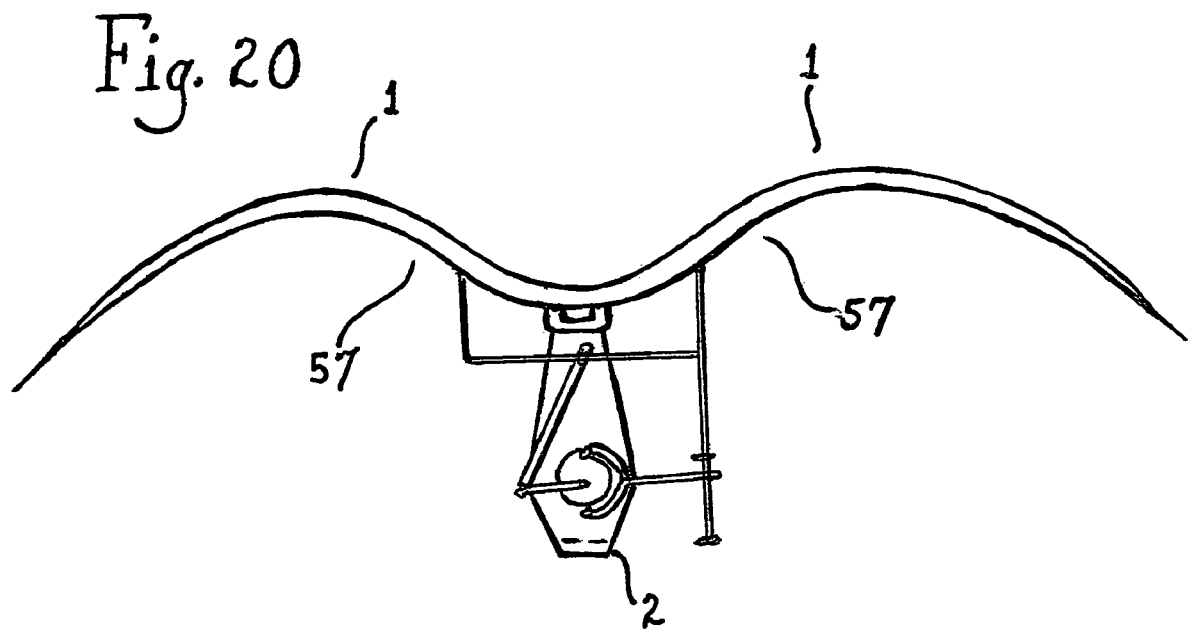

Because wings 1 are flexible, they have a further curvature that is seen in many birds' wings. A frontal view of this curvature is illustrated in FIG. 20. Proximally, wing 1 proceeds laterally outward from body 2 at a upward slant 57 which opposes a downward force on flexible wing 1 created by the leveraged weight of wing 1. The combined effect of a proximal upward slant and a distal downward bend produces a curved vertical wing configuration having an equilibrium position that is somewhat horizontal with respect to body 2.

An important aspect of the instant device is that upward and downward pumping of the flexible wings 1 is in synchrony with the natural frequency of flexible wings 1 in order to maximize efficient use of the energy in the system. The pumping of wings 1 must not oppose the restoring force created in wing 1 caused by elasticity. This pumping frequency may be predetermined experimentally or computationally, but in the present preferred embodiment this frequency is obtained by a method which samples an oscillatory property of the wing motion, in this case, the deflection the wings 1. Wings 1 are pumped in the correct direction at a time when deflection is substantially maximized in the up or down positions. In much the same manner, someone who is pushing another person on a playswing "feels" when to push as the swing momentarily comes to rest at a maximum displacement from equilibrium. In order to match the natural frequency of the flexible wings 1 it is necessary to pump at a time when flexible wing 1 is substantially reversing direction, and that reversal occurs at maximum deflection. This sampling method of applying force to the wings 1 automatically readjusts the timing of pumping if external influences cause the need.

Figure 21:
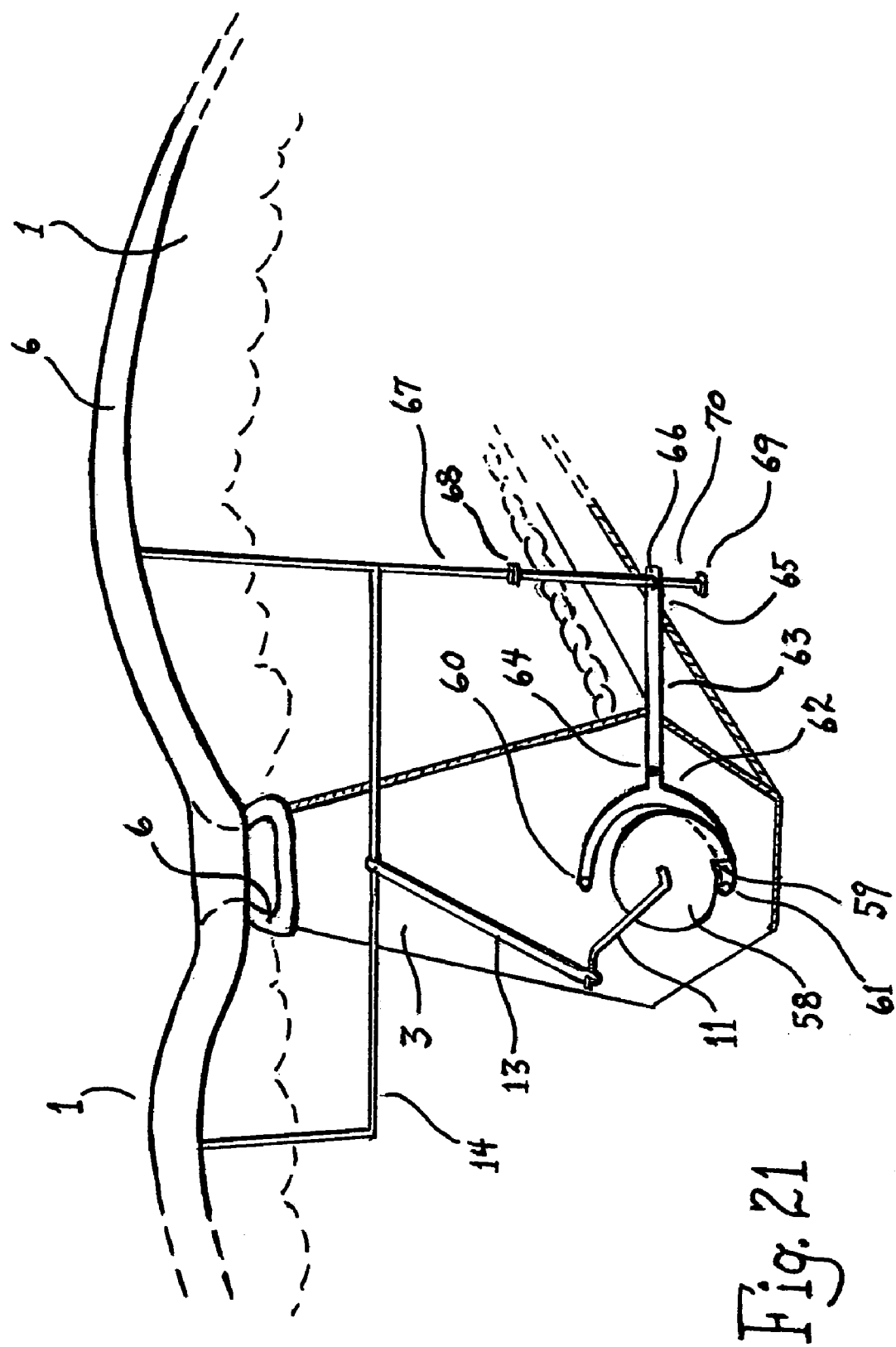

The operation of a pumping means of the preferred embodiment is shown more clearly in FIG. 21. Crank 11 is permitted to rotate, and through appropriate linkage, supplies upward and downward force to wings 1 only at a time which greatly cooperates with the natural frequency of wings 1. Crank 11 is in fixed communication with rotator disks 58, which is substantially a formed washer having a notch 59 that prevents rotation of the rotator disk 58 when engaged by upper stop catch 60 or lower stop catch 61. This arrangement is similar to an escapement mechanism which has been used in mechanical clocks for ages. Upper stop catch 60 and lower stop catch 61 are elbows at a proximal armature end 62 of armature 63, which pivots at fulcrum 64 and extends to a distal armature end 65 having an opening 66. Fulcrum 64 is located significantly closer to proximal armature end 62 than to distal armature end 65. Fulcrum 64 is essentially a pivot point about which armature 63 may rotate. The configuration of armature 63 provides leverage having significant mechanical advantage whereby a small force applied to distal armature end 65 creates a large force at proximal armature end 62 in an opposing direction. As armature 63 is pivoted, the stop catch which has prevented rotation of rotator disk 58 is pivoted out of the rotational path of rotator disk 58, and rotator disk 58 is thereby released for rotation. Simultaneously, the opposing stop catch, which has not been engaged by rotator disk 58 is pivoted into the rotational path of rotator disk 58. Rotator disk 58 differs in radius such that only one stop catch may enter the rotational path at a time, therefore only one stop catch may engage notch 59 at a time. After one-half rotation, notch 59 engages the opposing catch, preventing further rotation until disengaged. In this manner, a singular pivot of armature 63 allows rotator disk 58 to rotate one-half of a complete rotation. During this one-half rotation, conrod 13 forces the flexible wing pumping structure 14 up or down, which subsequently forces wings 1 up or down.

Timing of the pumping action of the device is accomplished by using an oscillatory property, the vertical deflection of the wings 1, to cause armature 63 to activate the pumping components when wings 1 are deflected substantially maximally up or down. A lightweight pliable disconnect rod 67 is a downward extension of flexible wing pumping structure 14 which communicates pivotably with wing spar 6 of wing 1. Vertical wing deflection therefore causes a corresponding vertical displacement of disconnect rod 67. Upper rod pin 68 and lower rod pin 69 are positioned along disconnect rod 67 near the opposing end 70 and are separated a distance allowing free movement through opening 66 until a pin engages armature 63 at opening 66. Upper rod pin 68 is positioned on disconnect rod 67 such that armature 63 is forced downward when wing 1 has substantially deflected maximally downward, and lower rod pin 69 is positioned on disconnect rod 67 such that armature 63 is forced upward when wing 1 has substantially deflected maximally upward. Therefore, leveraged movement of armature 63 causes disk stop catches 60 and 61 to release rotator disk 58 to rotate one-half turn substantially beginning when wing 1 is maximally deflected, either up or down. The repetition of this process causes wings 1 to flap at the correct time and in the correct direction to conform with the natural frequency of wings 1.

The preferred embodiment of the device described herein, therefore, describes a flying device having flexible wings of aerodynamic shape which are forced to flap at the damped natural frequency of the wings by a means utilizing feedback from the deflection of the wings 1. An additional advantage of such a pumping method is that, if there is an interruption or a change necessary in flapping frequency, an automatic adjustment is made.

Figure 22:
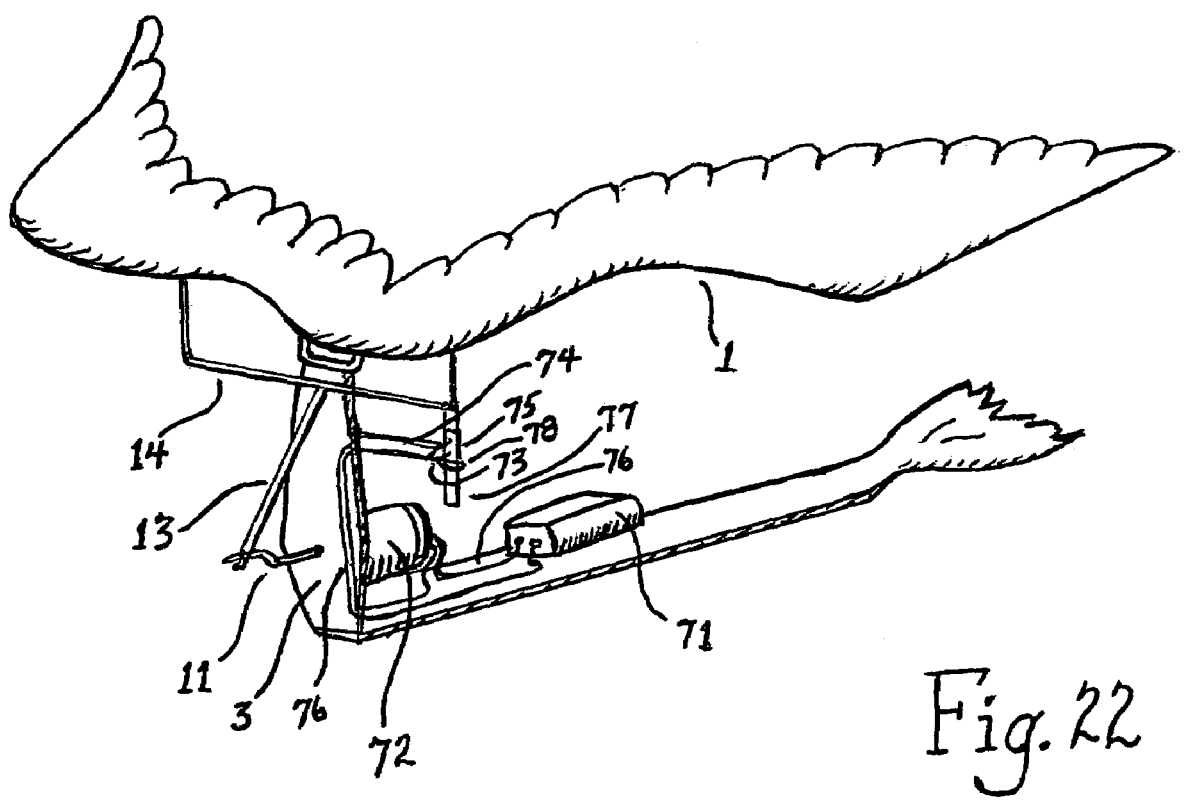

In order to further demonstrate that a variety of possibilities exist for pumping means to create synchronous flapping, an alternative embodiment of a synchronous pumping means of the present invention as illustrated in FIG. 22. This device incorporates electrical pumping means comprising a battery 71, a electrical motor 72, conrod 13 and wing pumping structure 14, to pump wings 1, either up or down, through each half cycle of rotation of crank 11. Electric motor 72 is activated by a wing-controlled switching system whereby substantially maximum displacement of the wing 1 activates the motor at the correct time to force conrod 13 and linked components to pump wings 1. Electric motor 72 is activated when brushes 73, which are comprised of two conductive bendable projections separated by a non-conductive material 74, lightly make electrical contact with a conductive material 75 thereby completing a series circuit formed by wires 76 to battery 71 and electric motor 72. A portion of vertical body extension 3 projects horizontally to support and stabilize brushes 73. Conductive material 75 is located substantially centrally on a timing elongate 77, which extends downward through a guide 78 which causes timing elongate 77 to be in electrical contact with brushes 73 as wings 1, therefore timing elongate 77, move up and down. Near the maximum upward or downward displacement of wing 1, brushes 73 cease to contact conductive material 75 on timing elongate 77 since timing elongate 77 ends are composed of a non-conductive material. Electric motor 72 ceases to pump wing 1 at this time, and because wing 1 is substantially elastic, wing 1 continues to a maximum distortion and thereafter reverses direction. Motor 72 is reactivated when brushes 73 make contact with conductive material 75 on the downstroke of wing 1. Brushes 73 cause crank 11 to force wings 1 downward since conductive material 75 is located and of dimension such that contact with brushes 73 creates exactly a half turn of crank 11. This process is repeated during flight, creating a pumping frequency consistent with the natural frequency of the wings 1. For best operation, components are of lightweight design and minimal resistance. Obvious optional elements such as gears or a capacitor to increase electrical surge improve the operation of this embodiment of the device. The embodiments suggested herein are simplified examples for design of the synchronized pumping of the wings of an elastic flying device.

Figure 23:
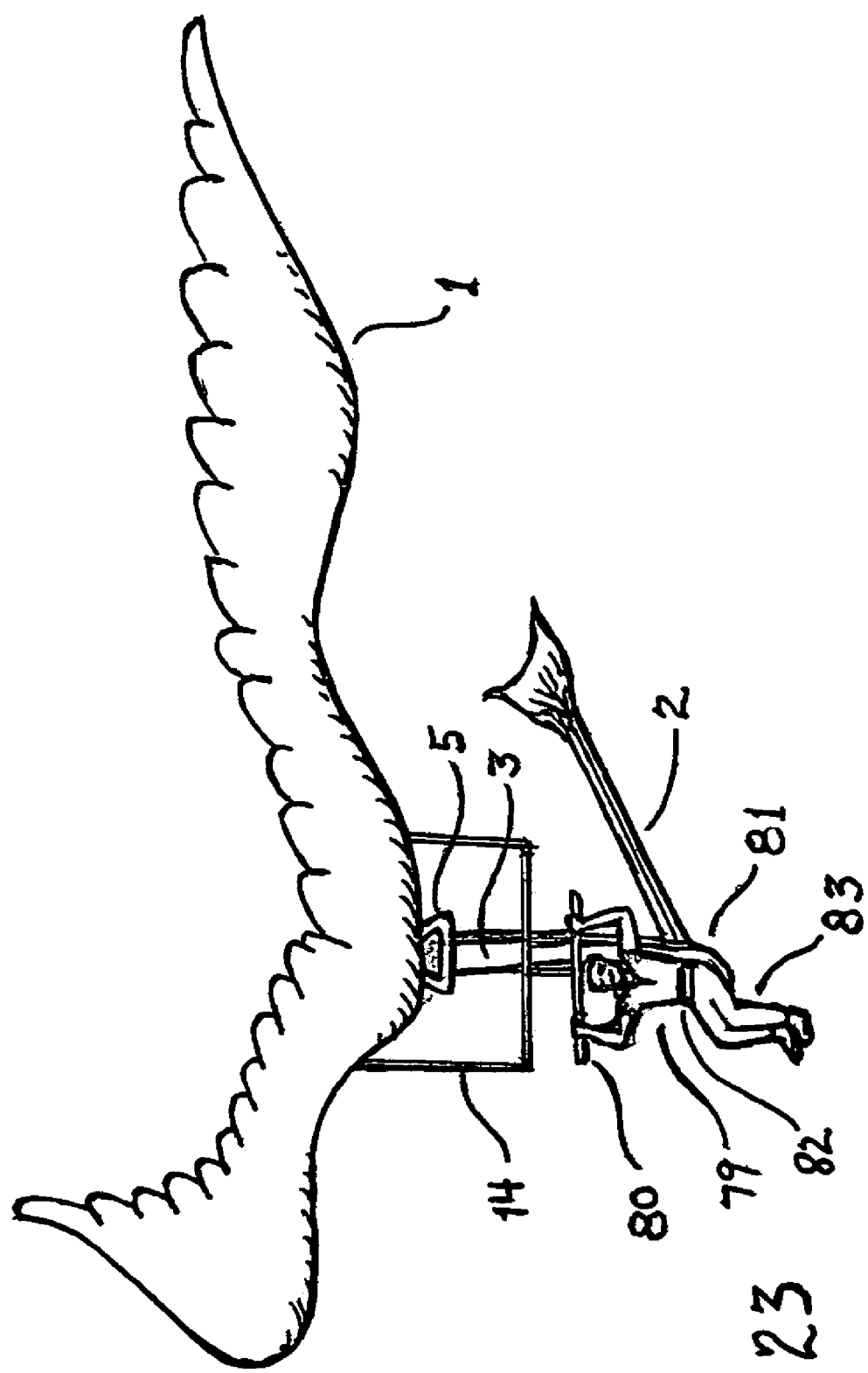

An embodiment of the instant device which is powered by a human is illustrated in FIG. 23 wherein a pilot 79 provides pumping power to flexible wings 1 at a frequency sympathetic to the natural frequency of the wings 1. The energy supplied by the pilot 79 is used to overcome the damping of the harmonic motion of the wings caused by air resistance and internal frictional energy losses. Flexible wing pumping structure 14 is forced sequentially upward and downward by pilot 79 at crossbar 80 according to the "feel" of the wing 1 motion, in much the same manner as synchronously flexing the free end of a plastic elongate into a sequence of large deflections by forcing the near end up and down by relatively small amounts. Seat 81 and belt 82 are communicated with body 2 of the device allowing pumping movement of wings 1 to occur relative to the body 2. Legs 83 of pilot 79 extend freely for landing and carrying purposes. Legs 83 also aid in turning, whereby banking turns are accomplished by weight shifting and wing warp caused when wing pumping mechanism 14 is pulled downward on one side and forced upward on the other. A further obvious possibility to improve control of such an embodiment is to hingeably fasten crook 5 to vertical body extension 3 such that a forward or rearward adjustment by pilot 79 on crossbar 80 will tilt the entire wing structure, thereby altering the angle of attack.

The instant manned embodiment has many features similar to the designs of conventional hang gliders and ultralight aircraft. However, those devices lack critical elements which are present herein. Wing composition must be such that a significant restoring force is created when wing 1 is distorted from equilibrium. Hang gliders are minimally pliable structures, and do not have enough resilience to effectively create a repetitive synchronous oscillation. Moreover, adequate trailing edge elasticity and differential flexure is not present in these devices, eliminating means of forward propulsion existing in the present invention. Although these devices vary greatly from the instant device, their successful operation demonstrates feasibility of similar elements in the instant invention.

Figure 24:
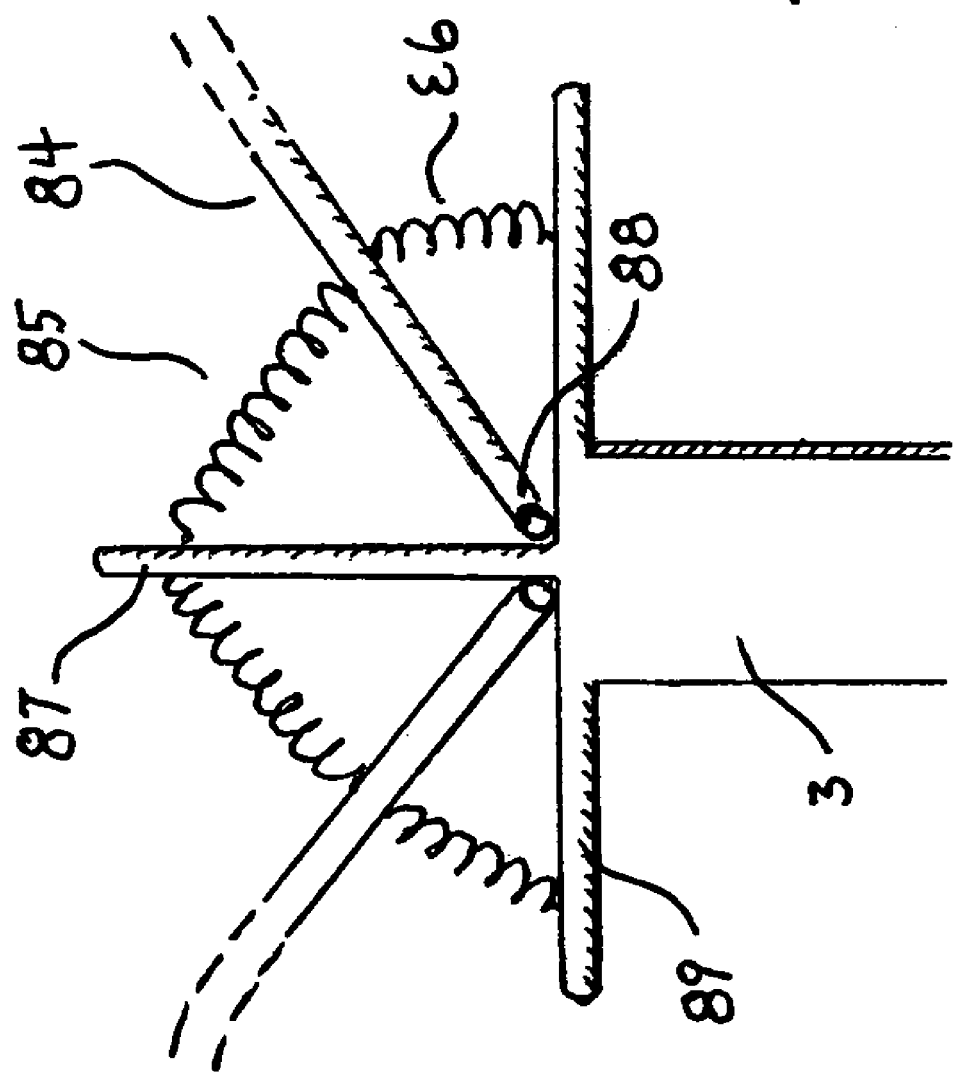

An alternative embodiment of a springboard structure for the instant device is shown in FIG. 24 wherein a close-up of the connection between wings and body is illustrated. Flexible springed wing 84 is translationally immoveable with respect to vertical body extension 3, but rotatable. Flexible springed wing 84 instead derives a significant portion of restoring force from springs 85 and 86. Upper spring 85 communicates with springed wing 84 and with a vertical brace 87, which extends upward from vertical body extension 3. Springed wing 84 is communicated with vertical body extension 3 in a pivoting manner at wing hinge 88. Lower spring 86 communicates with flexible springed wing 84 and with horizontal brace 89, which is fixedly communicated with vertical body extension 3. A restoring force is produced when flexible springed wing 84 is deflected either upward or downward. This restoring force is directed oppositely to the wing deflection and facilitates subsequent strokes. Such an arrangement produces a natural pendulum having a distinct damped oscillatory frequency that requires sympathetic pumping. Flexure produced by separate elastic elements such as springs or rubber bands therefore creates the same advantages as the fixed embodiment previously described. An important aspect of this embodiment is that the connection between the wing and body is translationally stationary. A combination of resilient wings fixedly attached at a proximal end as in the preferred embodiment previously described in conjunction with supplemental elastic elements as described in the present embodiment is herein considered as being obvious. Such a combination utilizes the advantages of both methods.

Figure 25:
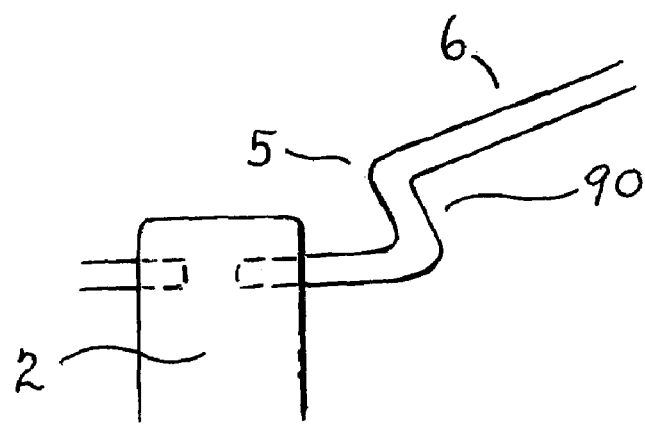
Figure 26:
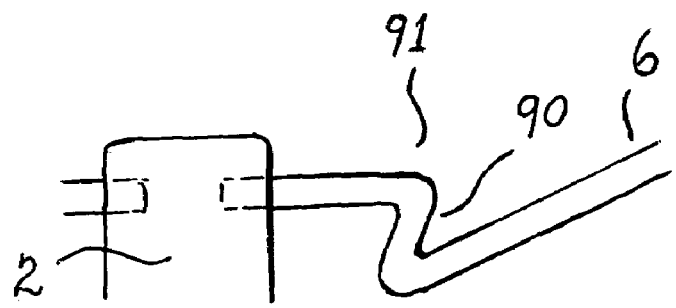
Figure 27:
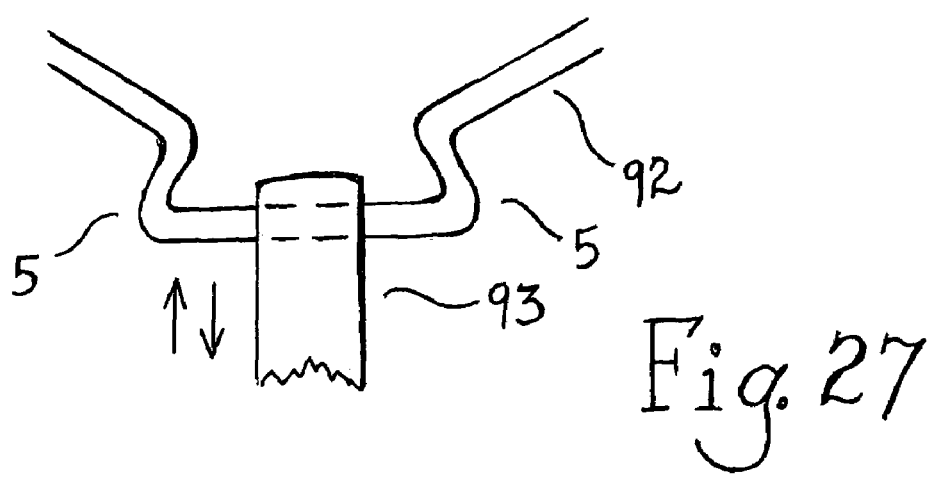

As shown in FIG. 25, crook 5, a radically angled section of wing spar 6, may obviously be fixedly attached to body 2 directly. A variety of configurations of crook 5 are possible, and crook 5 necessarily must be elastic and strong, since the leveraged forces produced by flexible wing 1 are concentrated there. A vertical portion 90 of the present design redirects vertical forces of the wing oscillation to lateral forces. FIG. 26 illustrates an another effective reversed crook 91 configuration wherein vertical portion 90 is downwardly directed. Crook 5 therefore plays an important part in stabilizing the vertical movement of body 2. Unrestricted up and down oscillation of body 2 is an undesirable characteristic of flapping wing flight for a variety of reasons, including energy loss. The prior art in the field has attempted to solve this problem by other, more complicated, means or neglected the problem altogether. It is suggested herein that a crook configuration added to the wing structure of many of the prior arts would improve performance therein. FIG. 27 shows one such suggested combination, wherein a singular wing spar 92 is driven up and down by an associated drive mechanism as described in much of the prior art. Drive arm 93 supports and forces singular wing spar 92 up and down, but now crooks 5 redirect vertical forces to lateral forces during operation reducing vertical oscillation of the body of the device.

Several additional embodiments of the concepts presented for the device are envisioned as being obvious, but not described herein. Some of these are:

utilizing wings and pumping mechanisms as described in conjunction with a common hang glider or ultralight aircraft whereby thrust is provided to assist flight. These appendages could be positioned at any of a variety of locations with respect to the aircraft, such as lateral wing extensions or separate components above or below the primary wing structure.

applying the principle of synchronous pumping to very small flying devices, possessing wings which have high natural frequencies.

applying the principles presented herein to devices having multiple sets of wings.

using electronic means to accurately determine the timing for imposing wing pumping having radio-controlled actions of the device attaching cameras to the device for purposes of surveillance utilizing internal combustion engines to power the device utilizing solar energy to power the device constructing flexible wings which are hingably foldable, yet maintain pliability in required directions separately connecting wings of the device to the body at locations on either side of the body in the manner previously suggested having hinged connection of crook 5 to allow tilting of the entire wing structure to alter the angle of attack varying the structure of crook 5 or eliminating it entirely having a sensitive switch in constant frictional contact with a timing elongate whereby a reversal in direction of the timing elongate causes the switch to be thrown thereby activating an electric motor in a reversing manner having adjustable flexure means, such as projectable spar elements which change the pumping frequency when and if needed having weights which are attachable to the wings to change pumping frequency when and if needed changing the shape of the crook 5 of the spar 6 incorporating additional flexure elements at various locations internal to the device aerodynamically shaping the body of the device having a lateral pumping means wherein pumping means forces crook 5 inward and outward, an action which will oscillate wings 1 upward and downward utilizing means for determining changes in acceleration, an accelerometer, of wings 1 to control the pumping means in accurate sympathy with the natural frequency Although the descriptions herein contain many specificities, these should not be construed as limiting the scope of the invention but as merely providing illustrations of some of the presently preferred embodiments of the invention. Thus the scope of the invention should be determined by the appended claims and their legal equivalents, rather than by the examples given.

We claim:

1. A device for flying through air comprising:
   (a) a body,
   (b) at least one flexible wing having a flexible trailing edge and a spar, wherein the spar has a crook, wherein the crook has a substanitially sharply curved configuration at a location proximal to said body,
   (c) a pumping means
   whereby said at least one flexible wing is in translationally fixed communication with said body and extends substantially laterally from said body to a distal free end therby substantially forming a natural vertically oscillating springboard having a unique natural frequency of oscillation and whereby vertical deflection of said at least one flexible wing by said pumping means creates a restoring force in an opposing direction to said at least one flexible wing and whereby said pumping means repeatedly applies a force on said at least one flexible wing at an oscillatory rate substantially consistent with said natural frequency of oscillation of said springboard thereby causing said at least one flexible wing to substantially vertically flap and said flexible trailing wing edge of said flexible wing to displace air in a substantially rearward direction producing thrust and causing movement of said device through air in a forward direction and whereby said substantially sharply curved configuration of said at least one flexible wing at a location proximal to said body reduces vertical forces produced on said body during oscillation of said at least one flexible wing.

2. The device of claim 1 wherein said oscillatory rate of said pumping means is regulated by means which sample at least one oscillatory property of said at least one flexible wing thereafter causing said pumping means to apply force to said at least one flexible wing substantially in synchrony with said natural frequency of oscillation of said flexible wing.

3. The device of claim 1 wherein said at least one wing has a cambered aerodynamic cross sectional shape whereby forward propulsion of said at least one wing of said device provides subsantial lift for said device.

4. The device of claim 1 wherein said flexible trailing edge of said at least one flexible wing is comprised of a multiplicity of cambered, elastic, and twistable featherlike elements whereby said featherlike elements create differential power on upstrokes and downstrokes of said at least one flexible wing.

5. The device of claim 1 wherein said natural frequency of oscillation of said at least one flexible wing is predetermined and thereafter said oscillatory rate of said pumping means is adjusted to pump at said natural frequency of oscillation of said at least one flexible wing.

6. The method of claim 1 wherein said at least one flexible wing is laterally configured whereby an inner lateral segment is directed angularly forward and an outer lateral segment is directed angularly rearward with respect to said body thereby creating a curvature of said at least one flexible wing and whereby flapping of said at least one flexible wing causes an increased rearward displacement of air by said distal lateral segment of said at least one flexible wing.

7. The method of claim 1 whereby said flexible trailing wing edge of said at least one flexible wing is substantially comprised of said multiplicity of separate pliable featherlike elements whereby said featherlike elements are individually oriented and structured to provide flexible rearward reaction with air when said at least one flexible wing is flapped and thereby producing efficient forward thrust of said device.

8. The device of claim 1 wherein said natural springboard is created by immoveable communication of said at least one flexible wing with said body whereby pumping of said at least one flexible wing by said pumping means produces an opposing restoring force in said at least one flexible wing thereafter facilitating deflection of a free end of said at least one flexible wing in an opposing direction.

9. The device of claim 1 wherein said natural springboard is created by communication of at least one separate elastic element to said at least one flexible wing and said body whereby pumping of said at least one flexible wing by said pumping means produces an opposing restoring force in said at least one elastic element and in said at least one flexible wing thereafter facilitating deflection in an opposing direction.

10. The device of claim 1 wherein energy for pumping said flexible wings is derived from at least one of a group of energy sources including electric power, human muscle power, combustion, elastic bands, springs, and solar power.

* * * * *